United States Patent
Yu et al.

(10) Patent No.: US 8,659,578 B2
(45) Date of Patent: Feb. 25, 2014

(54) OPTICAL SENSING UNIT, DISPLAY MODULE AND DISPLAY DEVICE USING THE SAME

(75) Inventors: Byung-Chun Yu, Paju-si (KR); Min-Ho Sohn, Anyang-si (KR); Hyung-Uk Jang, Goyang-si (KR); Hyung-Dai Joo, Daejeon (KR); Moon-Bong Song, Seoul (KR); Sang-Dae Park, Goyang-si (KR); Jae-Hun Shin, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 478 days.

(21) Appl. No.: 12/969,097

(22) Filed: Dec. 15, 2010

(65) Prior Publication Data
US 2011/0141062 A1  Jun. 16, 2011

(30) Foreign Application Priority Data

Dec. 15, 2009 (KR) .................. 10-2009-0124519
Sep. 30, 2010 (KR) .................. 10-2010-0095260

(51) Int. Cl.
  *G09G 5/00* (2006.01)
(52) U.S. Cl.
  USPC ........... 345/175; 345/173; 345/174; 345/178; 178/18.01; 178/18.09

(58) Field of Classification Search
  USPC .................. 345/173–178; 178/18.01–18.09, 178/19.01–19.06
  See application file for complete search history.

(56) References Cited

U.S. PATENT DOCUMENTS

| | | | |
|---|---|---|---|
| 6,654,007 B2 | 11/2003 | Ito | |
| 2001/0022579 A1* | 9/2001 | Hirabayashi | 345/175 |
| 2006/0232792 A1 | 10/2006 | Kobayashi | |
| 2008/0068352 A1 | 3/2008 | Worthington et al. | |
| 2009/0058833 A1* | 3/2009 | Newton | 345/175 |
| 2009/0128508 A1* | 5/2009 | Sohn et al. | 345/173 |
| 2009/0309841 A1* | 12/2009 | Wilson et al. | 345/173 |
| 2010/0309169 A1* | 12/2010 | Lieberman et al. | 345/175 |

FOREIGN PATENT DOCUMENTS

| | | |
|---|---|---|
| CN | 1440539 | 9/2003 |
| CN | 101145091 | 3/2008 |

OTHER PUBLICATIONS

Office Action and Search Report issued in corresponding Chinese Patent Application No. 201010586056.1, mailed Feb. 4, 2013.

* cited by examiner

*Primary Examiner* — Jennifer Nguyen
(74) *Attorney, Agent, or Firm* — Brinks Gilson & Lione

(57) ABSTRACT

An optical sensing unit, a display module and a display device using the same, the optical sensing unit uses the surface of a flat display panel as a touch surface and includes an infrared sensor module provided at a corner of the flat display panel.

34 Claims, 23 Drawing Sheets

Effective viewing angle

Effective viewing angle

● – actual touch point
○ – virtual touch point

OPTICAL SENSING UNIT, DISPLAY MODULE AND DISPLAY DEVICE USING THE SAME

This application claims the benefit of the Korean Patent Application Nos. P 10-2009-0124519, filed on Dec. 15, 2009 and P 10-2010-0095260, filed on Sep. 30, 2010, which are hereby incorporated by reference as if fully set forth herein.

BACKGROUND

1. Field of the Invention

The present disclosure relates to an optical sensing unit, and more particularly, to an optical sensing unit, in which an infrared sensor module having a touch detection function is arranged on a display panel so as to achieve slimness of a device and to simplify casing elements, a display module and a display device using the optical sensing unit.

2. Discussion of the Related Art

In general, a touch screen is one of various schemes for constructing an interface between an information communication device using various displays and a user. The touch screen is an input unit, which can implement the interface between the user and a corresponding device to which the touch screen belongs when the user brings his/her finger or a pen into contact with the touch screen.

Touch screens allow the user to touch buttons displayed on a display device with his or her finger, and are interactively and intuitively operated by the user, such that anyone, regardless of age or sex, can easily use the touch screens. Therefore, the touch screens are becoming increasingly common and are being applied to a variety of fields including, for example, issuance machines for use in banks or public offices, various medical instruments, information guide systems for tourist attractions and organizations, traffic information systems, and the like.

The touch screens are classified into various types according to touch recognition methods employed, for example, a resistive type, a capacitive type, an ultrasonic wave type, an infrared type, and the like.

Although the above-mentioned types of touch screens have different advantages, an infrared-type touch screen is attracting public attention in consideration of minimization of pressure applied to a touch surface and convenience of arrangement.

Hereinafter, a conventional infrared-type touch screen assembly will be described in detail with reference to the accompanying drawings.

FIG. 1 is a perspective view illustrating the conventional infrared-type touch screen assembly and a liquid crystal display module connected therewith, and FIG. 2 is a perspective view illustrating the conventional infrared-type touch screen assembly and a tempered glass panel.

With reference to FIGS. 1 and 2, the conventional infrared-type touch screen assembly 20 is connected to the upper portion of the liquid crystal display module 15 including infrared sensor modules 15 and separate casing elements to fix the infrared sensor modules 15.

The touch screen assembly 20 includes the tempered glass panel 25 at a lower portion thereof which is not connected with the liquid crystal display module 10, thereby obtaining a touch input region. That is, the tempered glass panel 25 is located on the liquid crystal display module 10, and functions as a touch surface. Here, the lower surface of the tempered glass panel 25 contacts the upper surface of a top case of the liquid crystal display module 10.

The liquid crystal display module 10 includes a liquid crystal panel, an optical sheet and a backlight unit provided under the liquid crystal panel, and edges and lower surfaces of the liquid crystal panel, the optical sheet and the backlight unit are surrounded by casing elements, such as the top case and a bottom cover.

In FIG. 1, non-described reference numeral indicates supports used to support the liquid crystal display module 10.

In this case, the liquid crystal display device 10 including the infrared-type touch screen assembly 20 has a thickness greater than the sum total of the thicknesses of the casing elements of the touch screen assembly 20, the thickness of the tempered glass panel 25, and the thickness of the liquid crystal display module 10, thus being incapable of achieving slimness.

Further, the conventional infrared-type touch screen assembly 20 is formed separately from the liquid crystal display module 10. Therefore, a process for combining the touch screen assembly 20 and the liquid crystal display module 10 is required and, in order to implement a touch scheme, a process for collecting respective components and applying coordinates on the touch screen assembly 20 to the liquid crystal panel is required.

In addition, the above-mentioned infrared-type touch screen assembly 20 includes two infrared sensor modules. Therefore, the touch screen assembly 20 is located at the outside of the liquid crystal panel due to a dead zone, in which recognition of coordinates is difficult, on a line connecting the two infrared sensor modules. In this case, the outer region of a liquid crystal display device is increased, and thus the size of a bezel is increased.

Further, in the conventional infrared-type touch screen assembly 20 including the two infrared sensor modules, when two or more objects are placed on the touch surface, a real image corresponding to actual coordinates of the objects and a virtual image (ghost) in which the objects are not actually present but there is a measurable possibility that the objects are present are indistinguishable from each other, and thus multiple touch points cannot be precisely recognized.

The above-mentioned conventional infrared-type touch screen assembly has the following problems.

First, the touch screen assembly and the liquid crystal display module are formed separately from each other, and thus in order to achieve touch detection, it is necessary to fix the touch screen assembly and the liquid crystal display modules using different casing elements and then to connect the touch screen assembly and the liquid crystal display module. Further, since the tempered glass panel is located between the touch screen assembly and the liquid crystal display module to protect the liquid crystal display module from the casing elements of the touch screen assembly, the liquid crystal display device is thick and heavy.

Second, since the tempered glass panel is used as the touch surface, brightness of the liquid crystal panel is lowered due to reflection of light from the surface of the tempered glass panel, and reflection of indoor lighting appears on the screen.

Third, if two infrared sensor modules are used, a dead zone is generated, and thus it is difficult to narrow the width of the bezel and to recognize multiple touch points.

Fourth, since a touch control board to control the touch screen assembly and a board to control the liquid crystal panel are separately provided, an interface device to connect these boards is additionally required.

BRIEF SUMMARY

An optical sensing unit, which uses the surface of a flat display panel as a touch surface, includes an infrared sensor module provided at a corner of the flat display panel.

A display module comprises: a flat display panel having a surface of as a touch surface; a support main located at an edge of the flat display panel, wherein the flat display panel is on the support main; and at least two infrared sensor modules provided on at least two corners of the flat display panel, respectively.

A flat display panel having a surface of as a touch surface; a support main located at an edge of the flat display panel, wherein the flat display panel is on the support main; at least two infrared sensor modules provided on at least two corners of the flat display panel, respectively; and a casing surrounding edges of the flat display panel including the infrared sensor modules, and the support main.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, which are illustrated in the accompanying drawings. Wherever possible, the same reference numbers will be used throughout the drawings to refer to the same or like parts.

Hereinafter, an optical sensing unit, a display module and a display device using the same in accordance with the embodiments of the present invention will be described in detail with reference to the accompanying drawings.

Optical sensing units in accordance with the embodiments of the present invention are the same in that each optical sensing unit directly or indirectly contacts a corner of a flat display panel and is covered with a top case or a front cover to be formed together with a display module during a formation process of the display module. Now, the optical sensing units in accordance with the embodiments of the present invention will be sequentially described.

Figure 1:
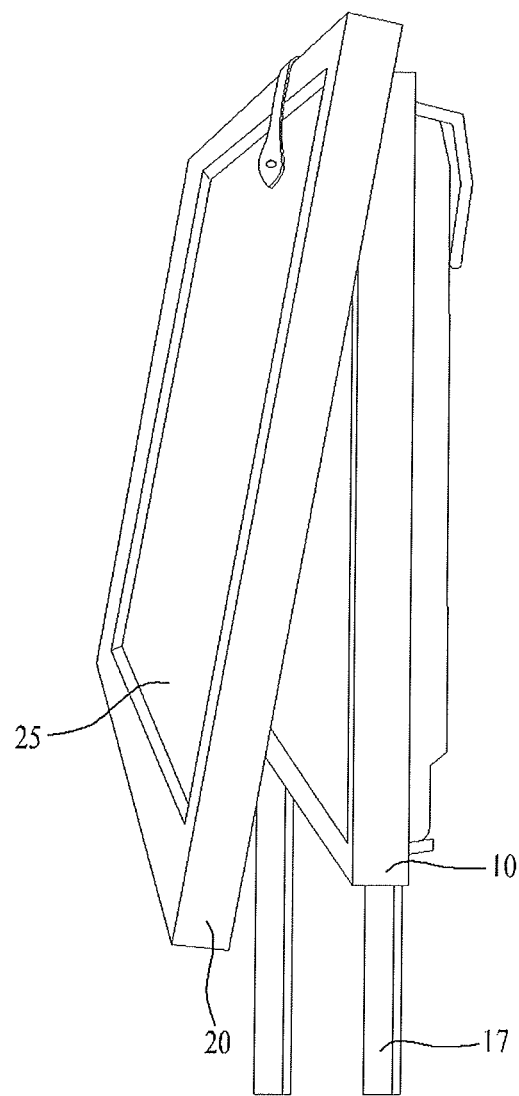
FIG. 1 is a perspective view illustrating a conventional infrared-type touch screen assembly and a liquid crystal display module connected therewith.
Figure 2:
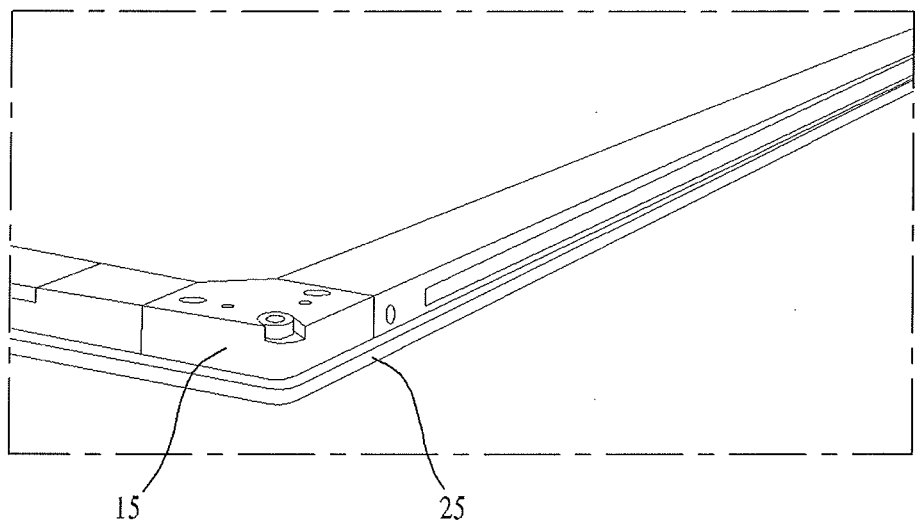
FIG. 2 is a perspective view illustrating the conventional infrared-type touch screen assembly and a tempered glass panel.
Figure 3:
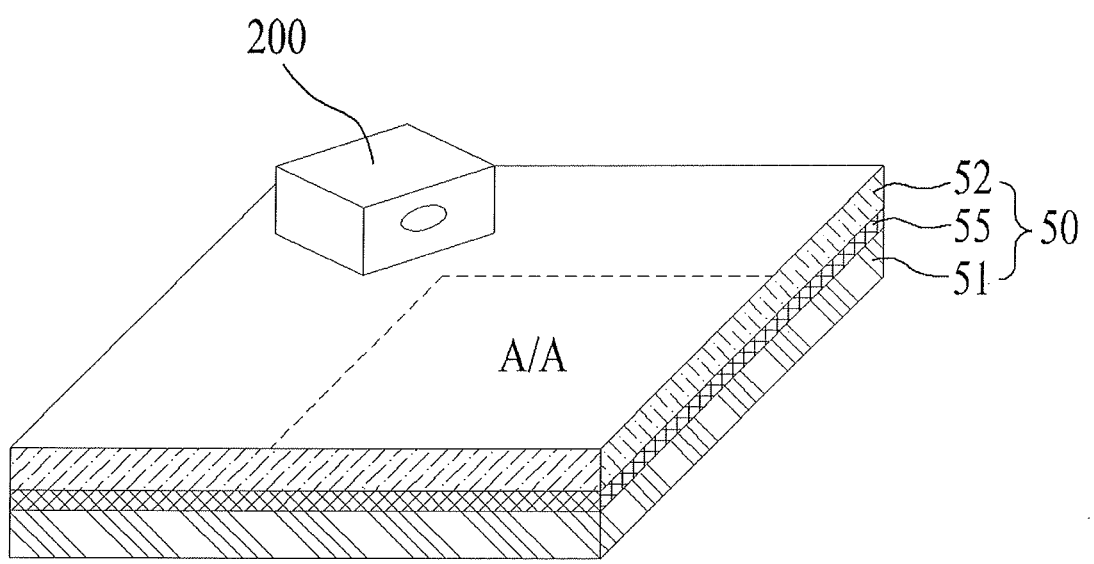
FIG. 3 is a perspective view illustrating an optical sensing unit in accordance with a first embodiment of the present invention.

FIG. 3 is a perspective view illustrating an optical sensing unit in accordance with a first embodiment of the present invention.

As shown in FIG. 3, the optical sensing unit in accordance with the first embodiment of the present invention includes an infrared sensor module 200. The optical sensing unit may include only the infrared sensor module 200, or may further include a retro-reflecting plate (not shown) around the infrared sensor module 200.

The infrared sensor module 200 may include both a light emitting unit (IR LED) and a light receiving unit, or may include only the light receiving unit. If the infrared sensor module 200 includes only the light receiving unit, the optical sensing unit may include a separate light emitting unit.

The light receiving unit of the infrared sensor module 200 includes a sensor, in which a plurality of light receiving elements to receive light and then to generate an electric charge are arranged, and a lens to focus incident light upon the sensor.

Further, the infrared sensor module 200 is connected to a touch control unit 650 (with reference to FIG. 19A), which controls operation of the infrared sensor module 200 and calculates a touch position of a user on the touch surface from an optical signal received by the light receiving unit.

Here, the optical sensing unit may further include a retro-reflecting plate on the upper surface of the edge of the flat display panel 50, at which the infrared sensor module 200 is not formed, in addition to the infrared sensor module 200, or further include a light emitting unit in addition to the retro-reflecting plate.

The infrared sensor module 200 is located at two or more corners of the display panel 50. In order to prevent generation of a dead zone or to achieve a multi-touch scheme, at least three infrared sensor modules are preferably provided. In this case, if an object is present on a line connecting the two neighboring infrared sensor modules, the remaining infrared sensor module can detect an angle of the object at a different angle from the two infrared sensor modules, and thus the dead zone is not generated.

Further, if two or more objects touch the flat display panel 50, a virtual image is distinguished from a real image and then removed by comparing coordinates respectively measured by a first sensor module pair including the neighboring first and second infrared sensor modules and a second sensor module pair including the neighboring second and third infrared sensor modules through triangulation, and thus multiple touch points may be detected.

As needed, if a separate virtual image removal algorithm is adapted, two infrared sensor modules 200 are provided at the corners of the flat display panel 50.

The optical sensing unit including the above infrared sensor module 200 contacts the surface of a non-display region (a region except for A/A: a region at the outside of a dotted line) of the flat display panel.

In this case, the surface of the flat display panel 50 serves as the touch surface, and thus a user can touch the flat display panel 50 without any intermediate material, such as a tempered glass panel, on the flat display panel 50.

The flat display panel 50 is obtained by bonding a first substrate 51 and a second substrate 52 facing each other under the condition that an intermediate layer 55 is interposed between the first and second substrates 51 and 52. The intermediate layer 55 varies according to operating principles of the flat display panel 50, and may be formed of liquid crystals, an electrophoretic material, an organic luminescent material, a field emitting material, quantum dots, vacuum, or air. Further, the flat display panel 50 may be any one of a liquid crystal display panel, an electrophoretic display panel, an organic luminescent display panel, a field emitting display panel, a quantum dot display panel, and a plasma display panel according to components of the intermediate layer 55. Further, the flat display panel may be replaced with any kind of flat display panel which is being developed now or will be developed in the future.

For example, if the flat display panel 50 is a liquid crystal display panel, first and second polarization plates are adhered to the rear surfaces of the first and second substrates 51 and 52. In this case, the surface of the second polarization plate contacting the infrared sensor module 200 is preferably reinforced. This prevents the second polarization plate from being damaged by contact with the infrared sensor module 200.

Figure 10A:
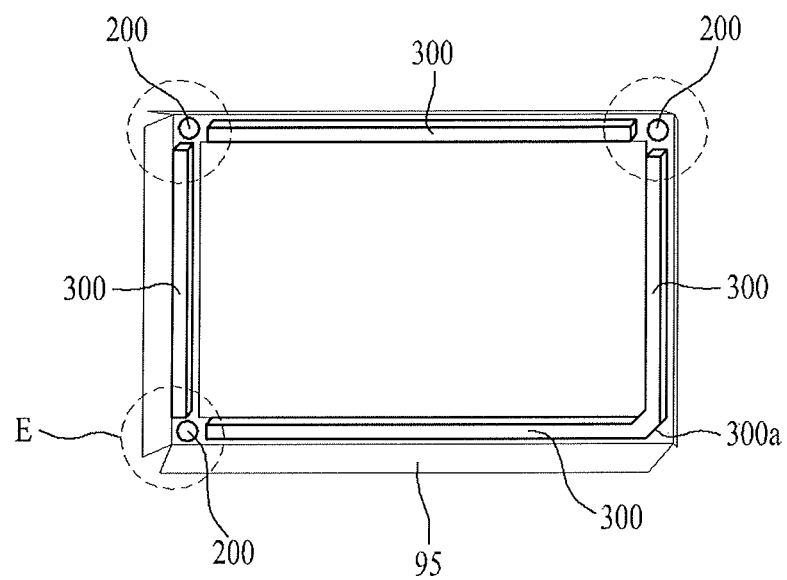
FIG. 10A is a view illustrating mounting of infrared sensor modules and retro-reflecting plates of FIG. 8 in a top case.

Each corner of the flat display panel 50 at which the infrared sensor module 200 is arranged is covered with a casing (not shown, with reference to FIG. 10A). Such a casing may be a top case surrounding upper and side portions of the non-display region of the flat display panel 50. Otherwise, the casing may include a system cover to cover a system including the non-display region of the flat display panel 50, or include both the top case and the system cover.

The top case is made of metal, and surrounds the edge and the lower surface of the display panel. Further, the system cover is referred to as a cover structure, and surrounds a system including the flat display panel. The system cover includes a front cover located above the upper portion of the flat display panel and a back cover located on the rear surface of the display panel, a part of the system cover covering the infrared sensor module 200 corresponds to the front cover.

Figure 4:
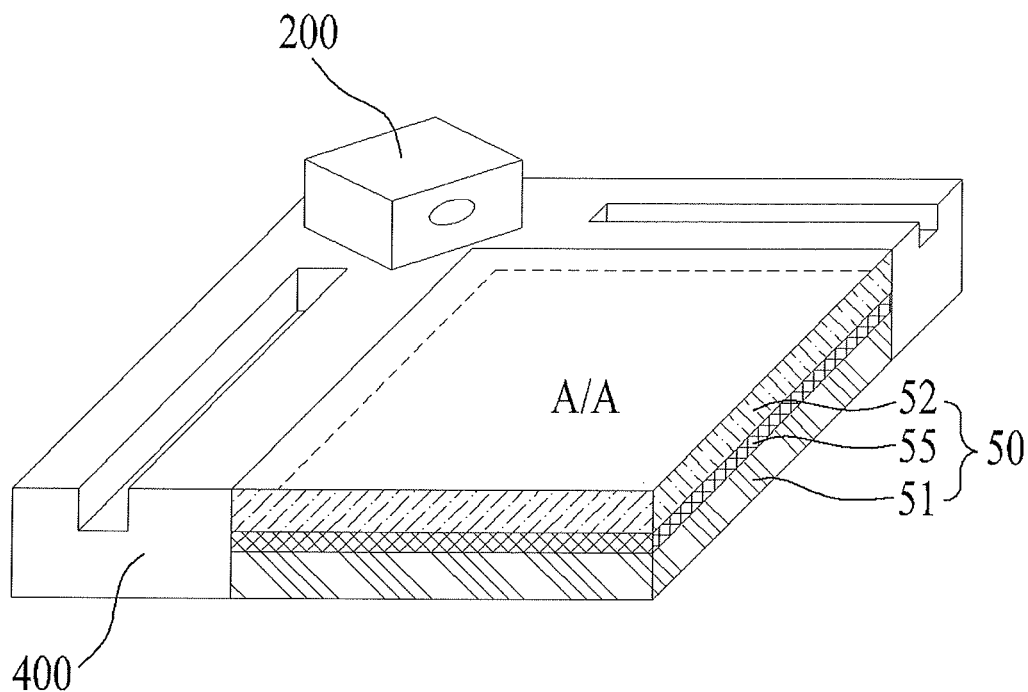
FIG. 4 is a perspective view illustrating an optical sensing unit in accordance with a second embodiment of the present invention.

FIG. 4 is a perspective view illustrating an optical sensing unit in accordance with a second embodiment of the present invention.

As shown in FIG. 4, the optical sensing unit in accordance with the second embodiment of the present invention includes an infrared sensor module 200 located on a support main 400 located at the edge of a flat display panel 50.

The infrared sensor module 200 may extend over a non-display region of the flat display panel 50 and the support main 400.

In any case, the infrared sensor module 200 is covered with a top case or a front cover.

Figure 5:
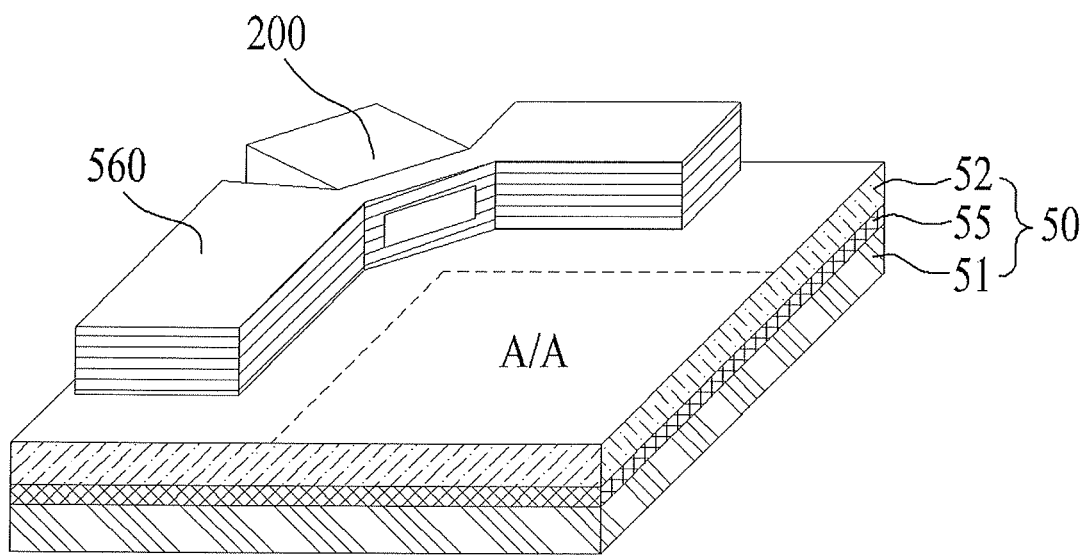
FIG. 5 is a perspective view illustrating an optical sensing unit in accordance with a third embodiment of the present invention.

FIG. 5 is a perspective view illustrating an optical sensing unit in accordance with a third embodiment of the present invention.

As shown in FIG. 5, the optical sensing unit in accordance with the third embodiment of the present invention includes an infrared sensor module 200 inserted into a bracket 560 and then located at a corner of a flat display panel 50. Here, the bracket 560 may be connected to a top case. Further, if a retro-reflecting plate is provided, the retro-reflecting plate may be extended to the side surface of the bracket 560 or be overlapped with the bracket 560.

Figure 6:
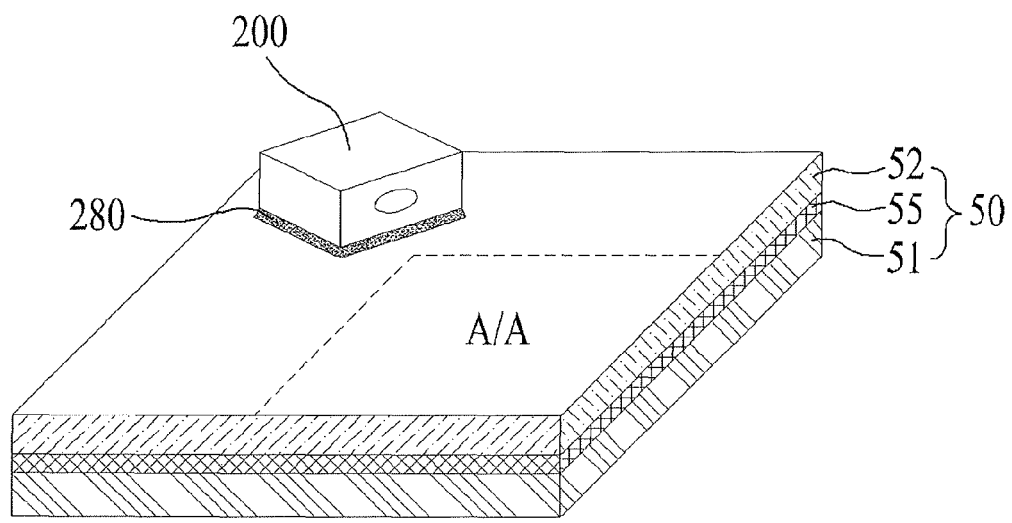
FIG. 6 is a perspective view illustrating an optical sensing unit in accordance with a fourth embodiment of the present invention.

FIG. 6 is a perspective view illustrating an optical sensing unit in accordance with a fourth embodiment of the present invention.

As shown in FIG. 6, the optical sensing unit in accordance with the fourth embodiment of the present invention includes an infrared sensor module 200 adhered to a flat display panel 50 by an adhesive member 280. In this case, the adhesive member 280 may be a double-sided adhesive tape or an adhesive agent.

If the adhesive member 280 is provided, a top case may be omitted and a front cover may directly cover the infrared sensor module 200.

Figure 7:
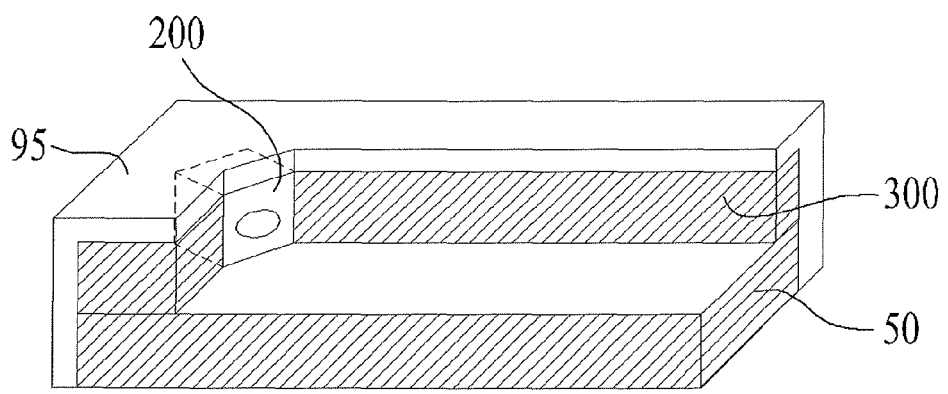
FIG. 7 is a perspective view illustrating an optical sensing unit in accordance with a fifth embodiment of the present invention.

FIG. 7 is a perspective view illustrating an optical sensing unit in accordance with a fifth embodiment of the present invention.

As shown in FIG. 7, the optical sensing unit in accordance with the fifth embodiment of the present invention includes an infrared sensor module 200 arranged at a corner of a flat display panel 50 and a retro-reflecting plate 300.

The optical sensing unit is located within a top case 95 surrounding the edge of the flat display panel 50. In this case, the infrared sensor module 200 may be adhered to the inner surface of the top case 95 by an adhesive member, or connected to the inner surface of the top case 95 using a separate element (i.e., a bracket and the like).

If the top case 95 is assembled with the flat display panel 50 such that the infrared sensor module 200 is located on the inner surface of the top case 95 in this manner, the infrared sensor module 200 may directly contact the display panel 50, or a separation space may be provided between the infrared sensor module 200 and the display panel 50.

Here, the optical sensing unit, as shown in FIG. 7, is formed in a frame shape including the infrared sensor module 200 and the retro-reflecting plate 300, and is thus referred to as an optical sensing frame in consideration of the shape thereof.

Each of the above-described optical sensing units in accordance with the embodiments of the present invention, as shown in FIGS. 3 to 7, may be connected to a support main, which is located at the edge of the flat display panel 50 to support the edge of the flat display panel 50, thereby defining a display module. Further, the display module is connected to a casing surrounding the edge, side portions, and lower surface of the display module, thus being defining a display device.

Hereinafter, an application of the optical sensing unit of the present invention to a display module or a display device will be described in detail.

Figure 8:
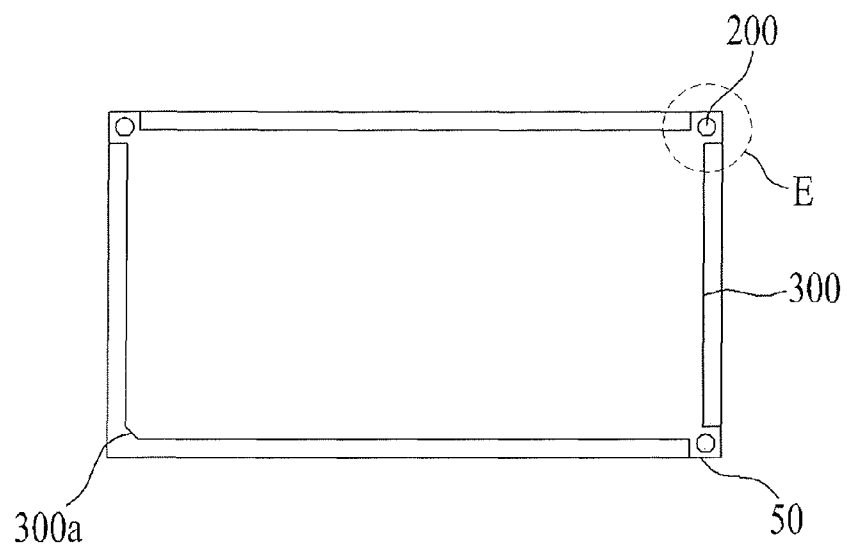
FIG. 8 is a plan view illustrating the relationship between the optical sensing unit of FIG. 7 and a flat display panel.
Figure 9:
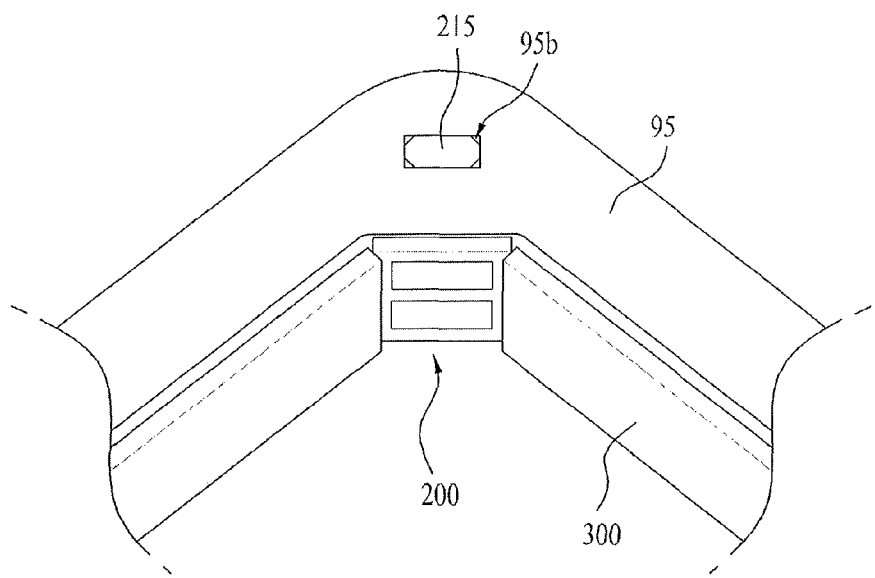
FIG. 9 is a perspective view of the portion E of FIG. 8.
Figure 10B:
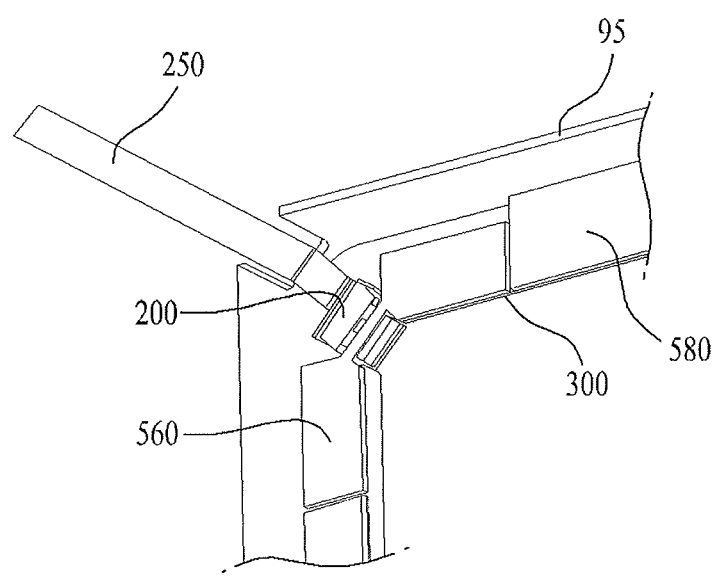
FIG. 10B is an enlarge view of the portion E of FIG. 10A.

FIG. 8 is a plan view illustrating the relationship between the optical sensing unit of FIG. 7 and a flat display panel, FIG. 9 is a perspective view of the portion E of FIG. 8, FIG. 10A is a view illustrating mounting of infrared sensor modules and retro-reflecting plates of FIG. 8 in the top case, FIG. 10B is an enlarge view of the portion E of FIG. 10A, and FIG. 10O is an exploded perspective view of the infrared sensor module of FIG. 10B.

As shown in FIGS. 8 to 10B, when the infrared sensor modules 200 are located at three corners of the rectangular flat display panel 50, if the retro-reflecting plates 300 are formed corresponding to the respective sides of the flat display panel 50, the retro-reflecting plates 300 include a retro-reflecting surface 300a provided at a corner of the flat display panel 50, at which the infrared sensor module 200 is not formed, and bent at an angle of about 45° so as to be opposite to the infrared light module 200 diagonally facing the retro-reflecting surface 300a.

The infrared sensor modules 200 and the retro-reflecting plates 300 are placed on the flat display panel 50. Further, each infrared sensor module 200 is provided with a protrusion 215 on the upper surface thereof, and guide grooves 95b, into which the protrusions 215 of the respective infrared sensor modules 200 are inserted, are formed in the top case 95. The infrared sensor modules 200 are connected to the top case 95 by inserting the protrusions 215 of the infrared sensor modules 200 into the guide grooves 95b of the top case 95. Further, when the retro-reflecting plates 300 are adhered to lateral portions of guide structures 580 and then the guide structures 580 are installed within the top case 95, the retro-reflecting plates 300 are located at the non-display region of the flat display panel 50.

Further, the guide structures 580, each of which contacts the bracket 560 on which the infrared sensor module 200 is mounted, are located at the respective sides within the top case 95. Here, the retro-reflecting plate 300 is located on lateral sides of both the bracket 560 and the guide structure 580.

In case of such a structure, the top case 95, the guide structures 580, the retro-reflecting plates 300, and the infrared sensor modules 200 are integrated and are then assembled with the flat display panel 50, thereby simplifying an assembly process and reducing the number of components to be assembled as compared to the conventional structure in which a display module and a touch screen assembly are separately assembled and are then connected to each other.

Figure 10C:
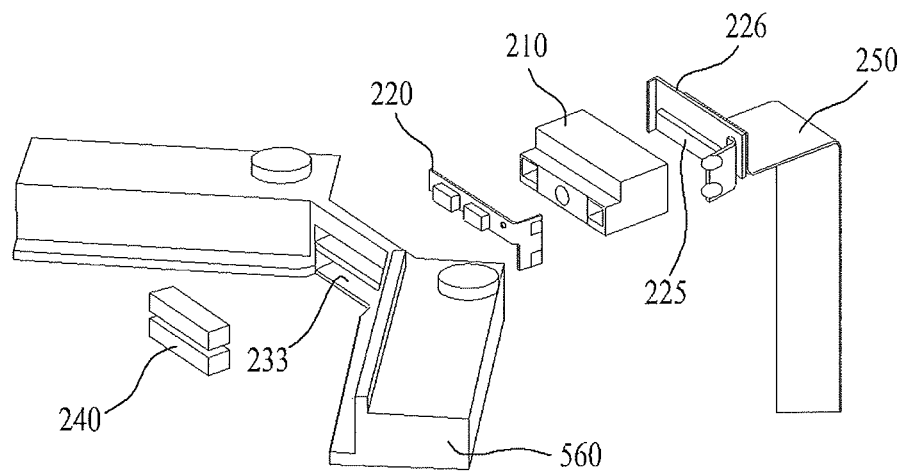
FIG. 10C is an exploded perspective view of the infrared sensor module of FIG. 10B.

As shown in FIG. 10C, the infrared sensor module 200 includes an infrared LED 220 to emit infrared light, an illumination lens (not shown) to control an emission angle of the light emitted from the infrared LED 220, an objective lens (not shown) to condense received light, a photo-sensor 225 to sense the light condensed by the objective lens, and a first optical filter 240 located on the front surfaces of the infrared LED 220. The infrared sensor module 200 further includes a housing 210, and a cover mold 233. The infrared LED 220 is mounted on the housing 210, and the photo-sensor 225 is arranged on the rear surface of the housing 210. The first optical filter 240 is inserted into the cover mold 233, and the cover mold 233 covers the upper portion of the housing 210 to protect the internal structures of the housing 210.

Here, the cover mold 233 may be integrated with the bracket 560.

In this case, the illumination lens distributes light at a narrow angle in a vertical direction, and distributes light at an angle of 90° in a horizontal direction, thereby maximizing light emission efficiency during emitting light.

In addition, the photo-sensor 225 may be a line-sensor array including a plurality of sensors, which is arranged on a Printed Circuit Board (PCB) 226, and the PCB 226 may be directly connected to a control unit (not shown) of the flat display panel 50 through a Flexible Printed Cable (FPC) 250. In this case, a control unit of the infrared sensor module 200 is integrated with the control unit of the flat display panel 50, and thus the infrared sensor module 200 is directly controlled by the control unit of the flat display panel 50. The FPC 250 is bent in the direction of the back surface of the infrared sensor module 200, and is adhered to the side surface of the top case 95 through a double-sided adhesive tape (not shown).

Preferably, the photo-sensor 225 has a resolution of 500 or more pixels in a horizontal direction (so as to detect positions of 500 or more pixels in the horizontal direction).

The photo-sensor 225 may also be referred to as an "image sensor".

Such an infrared sensor module 200 is arranged such that the front surface of the infrared sensor module 200 faces a corner of the flat display panel 50 in the diagonal direction. Thus, the infrared sensor module 200 functions to receive light retro-reflected from at least two sides of the flat display panel 50 and to sense light emitted from another infrared sensor module 200 located at the corner of the flat display panel 50 in the diagonal direction.

Further, the infrared sensor module 200 detects whether or not light reflected by the retro-reflecting plates 300 or light emitted from the infrared LED 220 is blocked at a touch position in contact with a touching object (e.g., an input unit, such as a finger or a pen).

Meanwhile, the retro-reflecting plates 300 are arranged on the edge of the flat display panel 50, and are adhered to the lateral portions of the guide structures 580 and the bracket 560. In this case, the guide structure 580 and the infrared sensor module 200 located at the corner of the flat display panel 50 have a height of about 4 mm (preferably, a height of 1~3.5 mm).

*An Embodiment of the Optical Sensing Unit of the Present Invention Applied to a Display Device and a Display Module*

Figure 11:
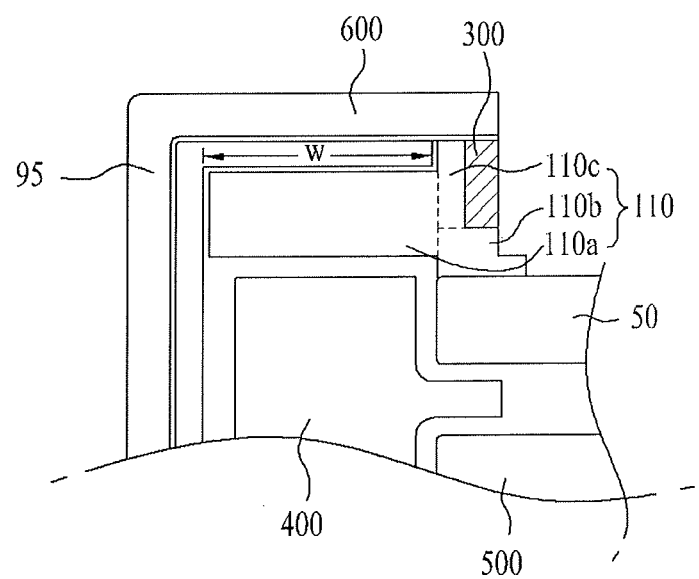
FIG. 11 is a longitudinal-sectional view illustrating the connection state between a system cover and the optical sensing unit in accordance with the present invention.
Figure 12:
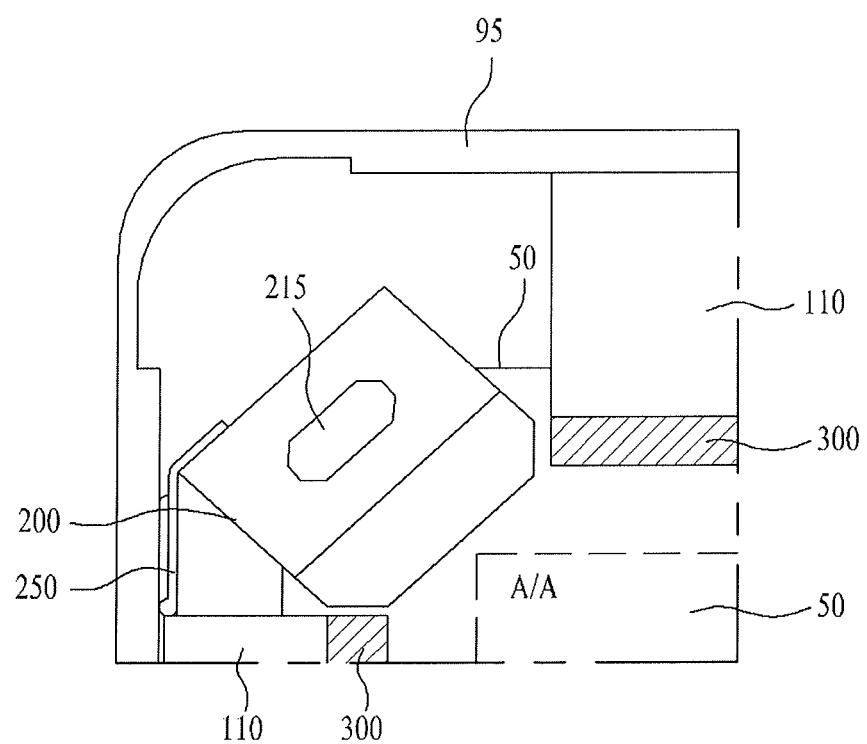
FIG. 12 is a plan view of the infrared sensor module, seen from the upper part, at a corner of a display module in accordance with the present invention.
Figure 13:
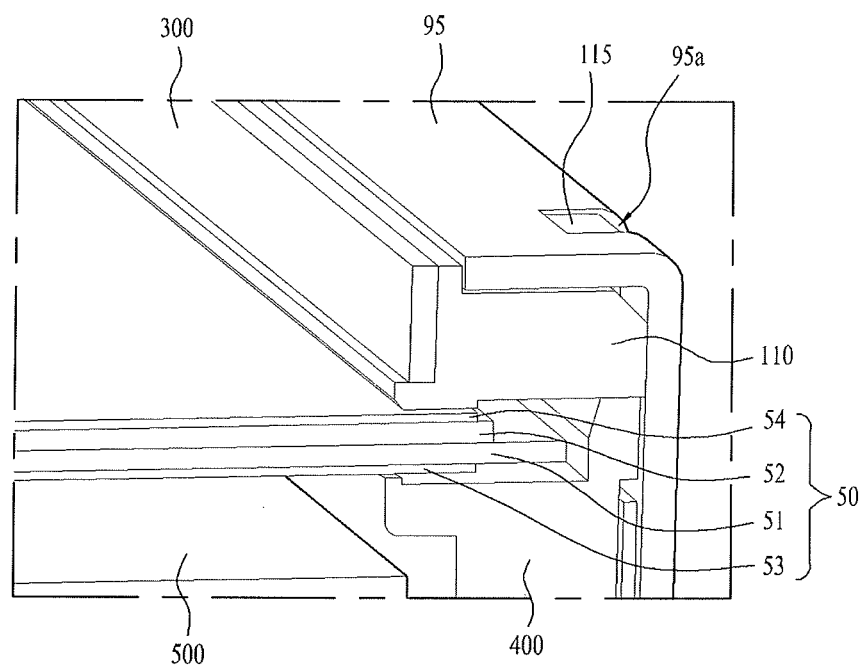
FIG. 13 is a perspective view of one side of the display module in accordance with the present invention, which is cut off.
Figure 14:
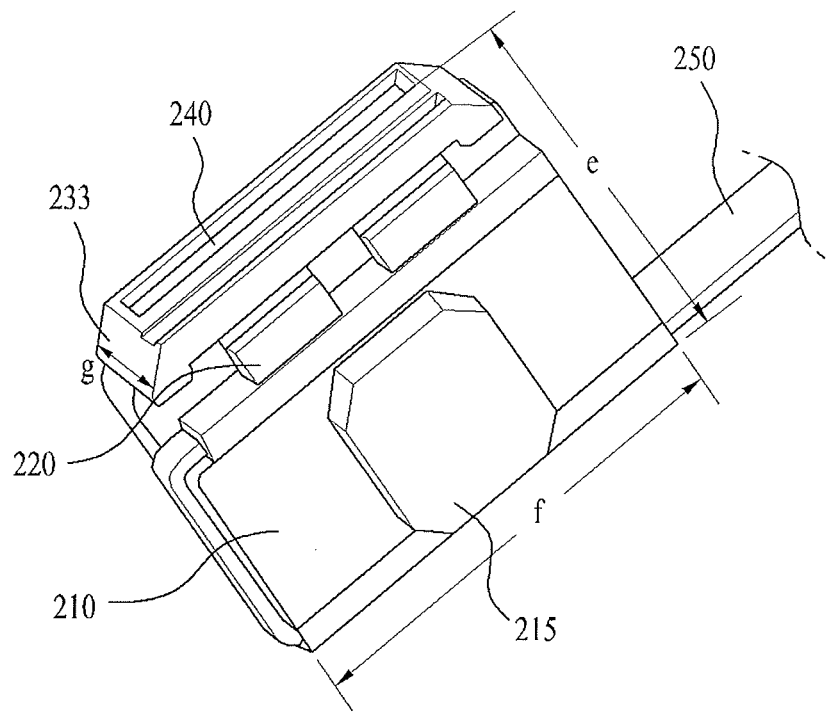
FIG. 14 is perspective view illustrating a connection structure of the infrared sensor module of FIG. 12.
Figure 15A:
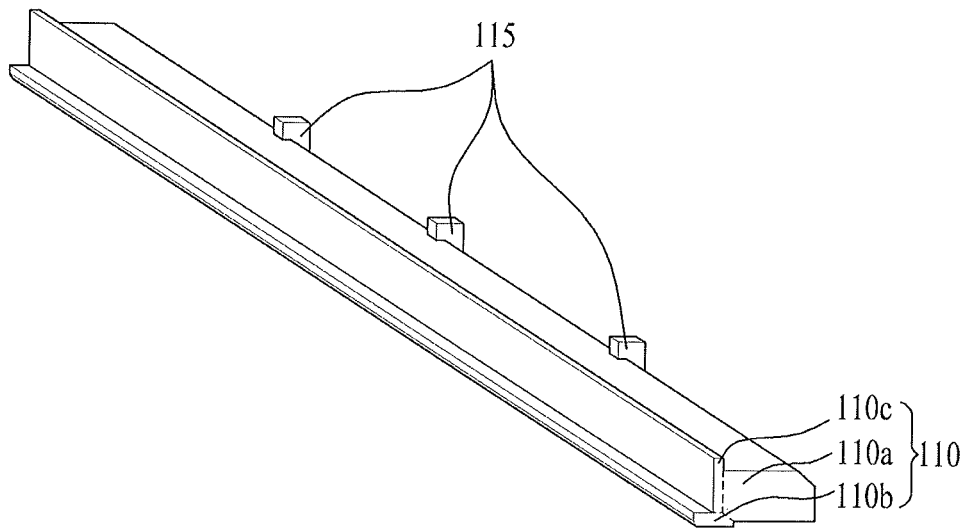
FIGS. 15A and 15B are perspective views illustrating a guide structure and a retro-reflecting plate of FIG. 13.
Figure 15B:
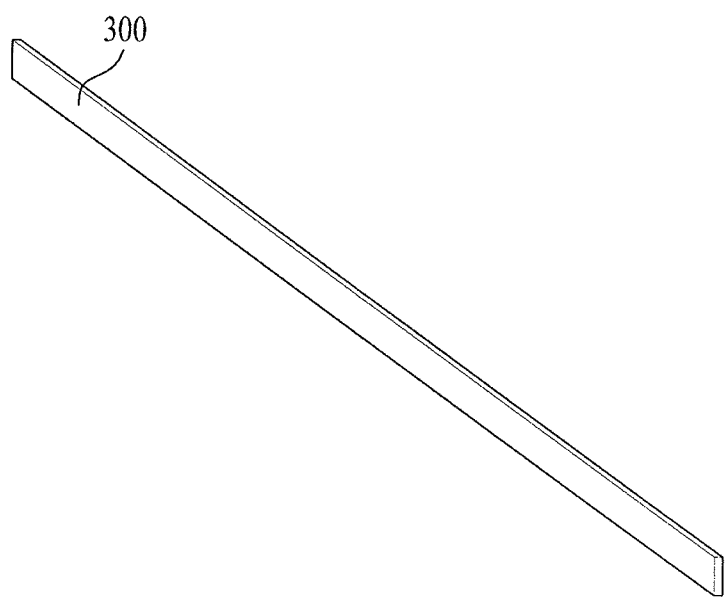

FIG. 11 is a longitudinal-sectional view illustrating the connection state between the system cover and the optical sensing unit in accordance with the present invention, FIG. 12 is a plan view of the infrared sensor module, seen from the upper part, at a corner of the display module in accordance with the present invention, FIG. 13 is a perspective view of one side of the display module in accordance with the present invention, which is cut off, FIG. 14 is perspective view illustrating the infrared sensor module of FIG. 12, and FIGS. 15A and 15B are perspective views illustrating the guide structure and the retro-reflecting plate of FIG. 13.

As shown in FIGS. 11 to 15B, the display device in accordance with the present invention includes a flat display panel 50, a support main 400 located at the edge of the flat display penal 50 to support the flat display panel 50, infrared sensor modules 200 located at two or more corners of the flat display panel 50, a top case 95 surrounding upper portions of the infrared sensor modules 200 and the side surface of the support main 40, and a system cover 600 to cover the top case 95 and the exposed upper surfaces of the guide structures.

The display device in accordance with the present invention further includes retro-reflecting plates 300 on the upper surface of the edge of the flat display panel 50 at which the infrared sensor modules 200 are not located. The retro-reflecting plates 300 are adhered to the lateral portions of the guide structures 110, and are then located at the non-display region of the flat display panel 50.

The display device in accordance with the present invention further includes a backlight unit 500 below the flat display panel 50.

In this case, the support main 400 has a protrusion between the flat display panel 50 and the backlight unit 500, and the flat display panel 50 is seated on the protrusion.

The guide structure 110 includes a body 110*a* located under the top case 95, a coupling portion 115 which is protruded from the body 110*a* and is coupled to a groove of the top case 95, a lower support 110*b* which supports the lower portion of the retro-reflecting plate 300 and presses the flat display panel 50, and an upper protrusion 110*c* which is protruded from the body 110*a* and reaches the top case 95. In this case, a double-sided adhesive (not shown) is interposed between the retro-reflecting plate 300 and the protrusion 110*c* of the guide structure 110, thereby enhancing adhesion between the retro-reflecting plate 300 and the protrusion 110*c*.

As needed, the groove of the top case 95 and the coupling portion 115 may be omitted.

The protruded length of the lower support 110*b* may be equal to or greater than the thickness of the retro-reflecting plate 300.

The protrusion 110*c* is exposed from the top case 95 and may be covered by the system cover 600 located on the top case 95. That is, the system cover 600 has an upper surface covering the retro-reflecting plate 300.

Here, the maximum height of the guide structure 110 including the protrusion 110*c*, the body 110*a*, and the lower support 110*b* may be set to 4 mm or less, and preferably, set to 1~3.5 mm. In addition, a horizontal width of the guide structure 110 is 10 mm or less (preferably, 1~10 mm), and the guide structure 100 is covered with the top case 95 or the system cover 600. As needed, if a width of portions of the top case 95 and the system cover 600 covering the edge of the flat display panel 50 is reduced, the horizontal width of the guide structure 100 may be designed to be smaller.

The guide structures 110 are formed corresponding to the sides of the flat display panel 50 on which the infrared sensor module 200 is not formed, and then connected.

In case of a structure in which the top case 95 is omitted, the edge of the flat display panel 50 is surrounded simply by the system cover 600. In this case, the optical sensing unit, including the infrared sensor module 200, the guide structure 110 and the retro-reflecting plate 300, is covered with the system cover 600.

The top case 95 made of metal is located at the edge of the flat display panel 50, surrounds the upper edges and side surfaces of the flat display panel 50 and the support main 400, and constitutes a display module together with a bottom cover (not shown) surrounding the rear surface of the lower portion of the backlight unit 500. The top case 95 may be in contact with a ground portion of the infrared sensor module 200 or the flat display panel 50.

Further, the system cover 600 made of plastic includes a front cover to cover the upper portion of the edge and the side surface of the display module, and a back cover (not shown) surrounding a system (not shown) controlling the display module from a lower part.

With reference to FIGS. 9 and 14, each of a depth (e) and a length (f) of the infrared sensor module 200 is set to 10 mm or less (preferably, 1~10 mm), and a height (g) of the infrared sensor module 200 is set to 3.5 mm or less. The infrared sensor module 200 is located within a space between the flat display panel 50 and the top case 95. Further, the infrared sensor module 200 faces the flat display panel 50.

Here, as the height (g) is reduced, slimness of the display device is achieved, and as the depth (e) is reduced, an area of the top case 95 covering the infrared sensor modules 200 is reduced and thus a narrow bezel is achieved.

If the optical sensing unit in accordance with the present invention is applied to the display device in such a manner, a horizontal width (w) of the upper surface of the top case 95 is reduced by the sum total of thicknesses of the retro-reflecting plate 300 and the upper protrusion 110*c*, and the retro-reflecting plate 300 is adhered to the upper protrusion 110*c* and is thus exposed from the top case 95.

The height of the exposed upper ends of the upper protrusion 110*c* and the retro-reflecting plate 300 is approximately equal to that of the upper surface of the top case 95, and the retro-reflection plate 300 is located higher than the upper surface of the top case 95, thereby increasing an area to reflect light and thus improving touch sensitivity.

Such a structure increases an area of the retro-reflecting plate 300 and eliminates a structurally covered portion of the retro-reflecting plate 300 as compared to the structure in which the retro-reflecting plate is covered with the top case, thereby increasing touch sensitivity. Particularly, the height of the upper protrusion 110*c* of the guide structure 110 is approximately equal to that of the retro-reflecting plate 300, i.e., corresponding to about 4 mm (preferably, 1~3.5 mm). The retro-reflecting plate 300 is extended throughout the height, thereby improving a quantity of light retro-reflected by the retro-reflecting plate 300 by about 30% or more as compared to the structure in which the retro-reflecting plate is covered with the top case.

The system cover 600 is located to cover the retro-reflecting plate 300.

In FIG. 13, non-described numerals 53 and 54 respectively indicate a first polarization plate and a second polarization plate formed when a liquid crystal panel is used as the flat display panel 50. In this case, the surface of the second polarization plate 54 directly contacting the guide structure 110 is preferably reinforced so as to protect the flat display panel 50.

Figure 16:
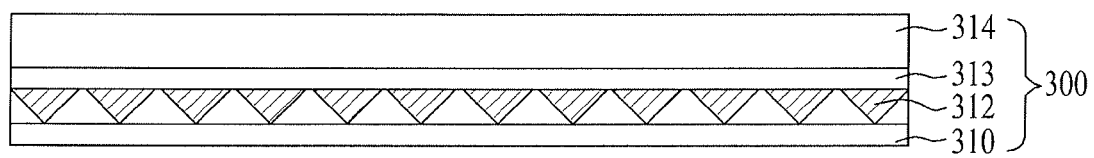
FIG. 16 is a cross-sectional view illustrating a retro-reflecting plate of the optical sensing unit.
Figure 17:
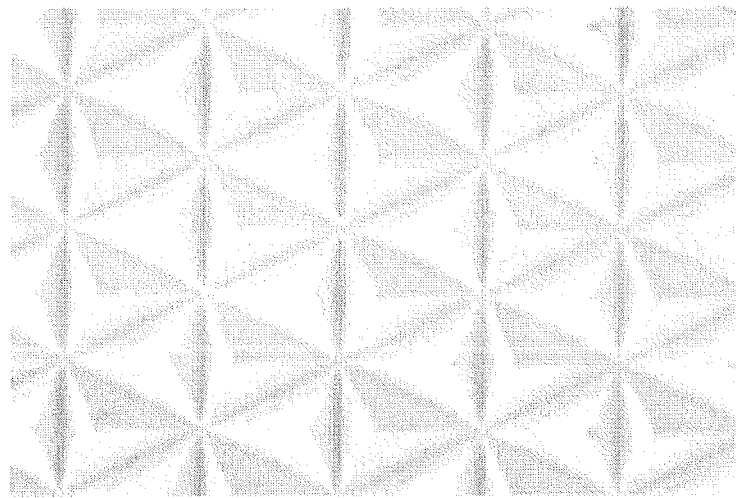
FIG. 17 is a photograph illustrating an inner prism of the retro-reflecting plate shown in FIG. 16.
Figure 18:
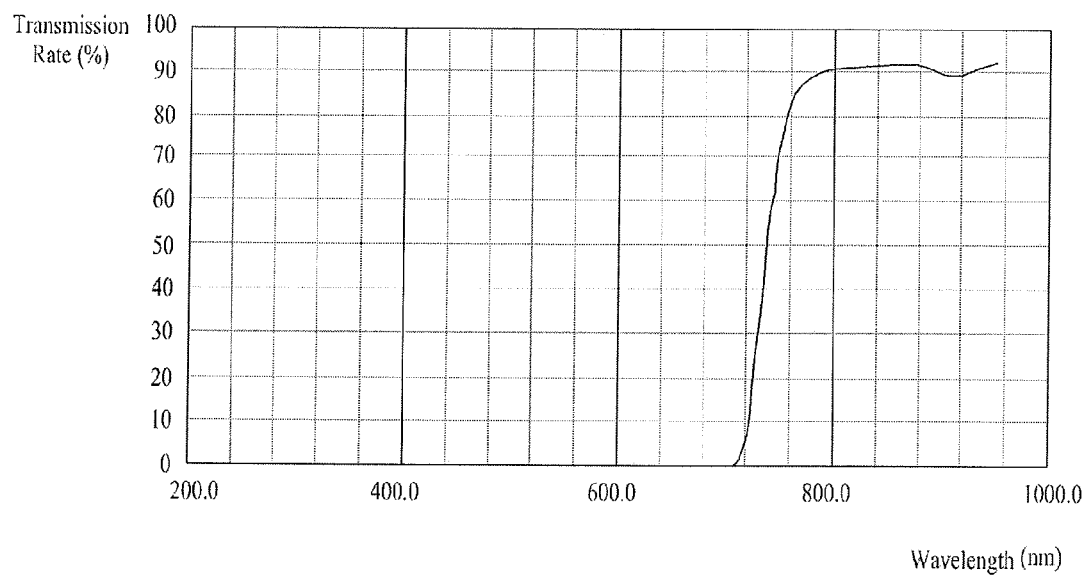
FIG. 18 is a graph illustrating the ratio of a wavelength to a transmission rate according to optical filter transmission characteristics of the retro-reflecting plate.

FIG. 16 is a cross-sectional view illustrating a retro-reflecting plate of the optical sensing unit, FIG. 17 is a photograph illustrating an inner prism of the retro-reflecting plate shown in FIG. 16. FIG. 18 is a graph illustrating the ratio of a wavelength to a transmission rate according to optical filter transmission characteristics of the retro-reflecting plate.

Referring to FIG. 16, the retro-reflecting plate 300 includes a retro-reflecting layer 312, a first adhesive layer 310 formed at the bottom of the retro-reflecting layer 312, a second adhesive layer 313 formed at the top of the retro-reflecting layer 312, and a second optical filter 314 formed on the second adhesive layer 313.

In this case, the retro-reflecting plate 300 is attached to the lateral side (upper protrusion portion 110c) of the guide structure 110 through the first adhesive layer 310, and is formed to be adjacent to the infrared sensor modules 200 of the corner portions.

In addition, the retro-reflecting layer 312 is configured in the form of a cube-cornered cube such that it is beneficial to an incident angle related to a wide angle of 0°~65°. As shown in FIG. 17, the retro-reflecting layer 312 may be configured in the form of concatenated micro-prisms.

Referring to FIG. 18, the second optical filter 314 is designed to transmit only an infrared light having a wavelength of about 700 nm or higher. In this case, the second optical filter 314 may be formed of acrylic resin, for example, poly methyl methacrylate (PMMA) or polycarbonate.

In order to transmit only the infrared light, the second optical filter 314 may be colored in black.

Otherwise, the second optical filter 314 may include a glass material therein.

In this case, the retro-reflecting plate 300 receives an emission light from the Infrared sensor module 200, and reflects the received light.

Meanwhile, the reason why the infrared sensor module 200 is arranged at three corners of the flat display panel. In case of a one-touch scheme, at a touch position, through the use of two neighboring sensors, the blocking of a reflection light reflected from the retro-reflecting plate 300 can be recognized, or the blocking of light emitted from the Infrared sensor module 200 at the touch position caused by a touching object (e.g., an input means such as a finger or pen) can also be recognized. In case of a multi-touch scheme of two or more touches, a position error generated when a touch position is first sensed by two neighboring Infrared sensor module 200, is then re-sensed by the remaining Infrared sensor module 200 and its neighboring Infrared sensor module 200 in such a manner that a virtual image removing algorithm can be adapted to recognize multiple touches.

FIGS. 19A to 19D are plan views illustrating various operating methods of the optical sensing unit in accordance with the present invention.

Figure 19A:
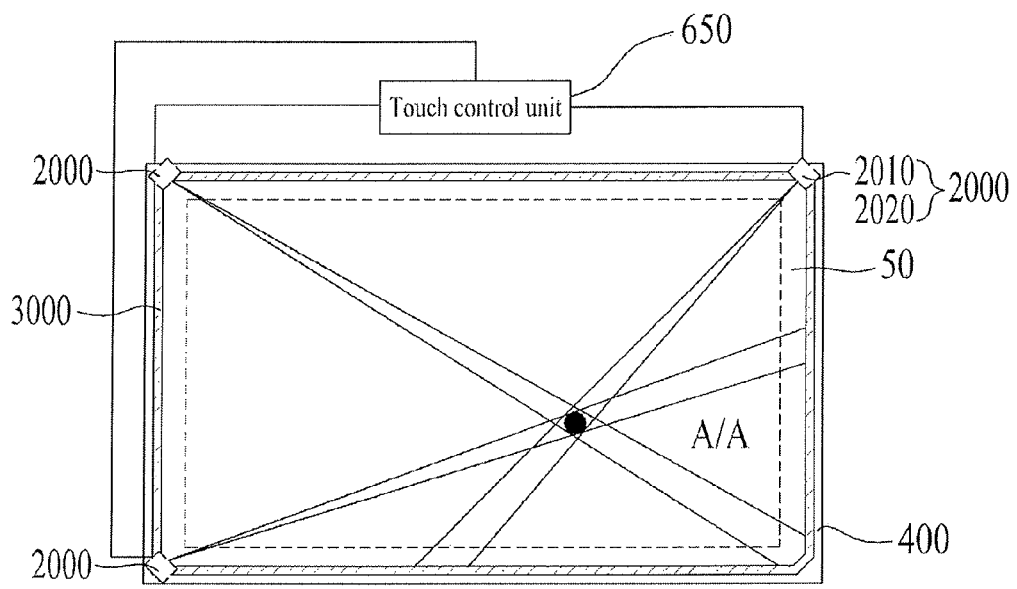
FIGS. 19A to 19D are plan views illustrating various operating methods of the optical sensing unit in accordance with the present invention.

FIG. 19A illustrates infrared sensor modules 2000, each of which includes both a light receiving unit 2010 and a light emitting unit 2020. Here, retro-reflecting plates 3000 are arranged at the edge of the flat display panel 50 at which the infrared sensor module 2000 is not formed.

In this case, when the flat display panel is touched at a specific region, a touch position is detected by detecting a position at which light emitted by the infrared sensor modules 2000 and reflected by the retro-reflecting plates 3000 is blocked by a touching object (e.g., an input unit, such as a finger or a pen).

The touch control unit 650 to which the respective infrared sensor modules 2000 are connected controls operations of the infrared sensor modules 2000, and calculates the touch position of the touching object on a touch surface based on optical signals received by the light receiving units 2010.

Here, non-described reference numeral 400 indicates a support main.

Figure 19B:
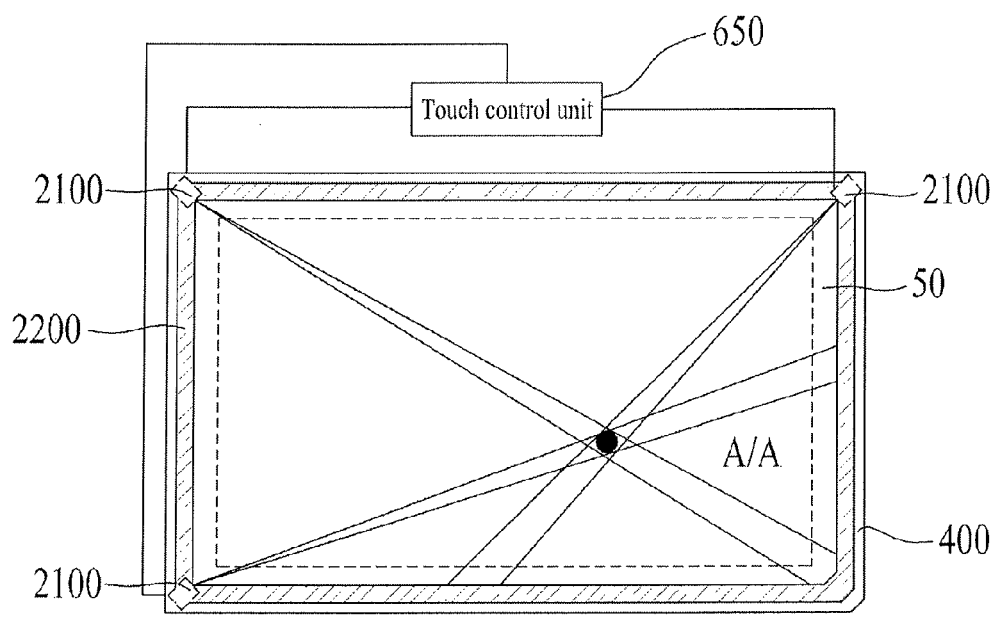

FIG. 19B illustrates infrared sensor modules 2100 having only a light receiving function and a light emitting unit 2200 provided at the edge of a flat display panel 50 at which the infrared sensor module 2100 is not arranged. In this case, separate retro-reflecting plates are not required, a portion of the flat display panel 50 covered with a touching object is sensed by detecting a distribution of quantities of light which is emitted from the light emitting unit 220 and is then incident upon the infrared sensor modules 2100, and thus presence or absence of a touch action is detected.

Here, the light emitting unit 2200 is formed by arranging a plurality of infrared LEDs in a line.

Figure 19C:
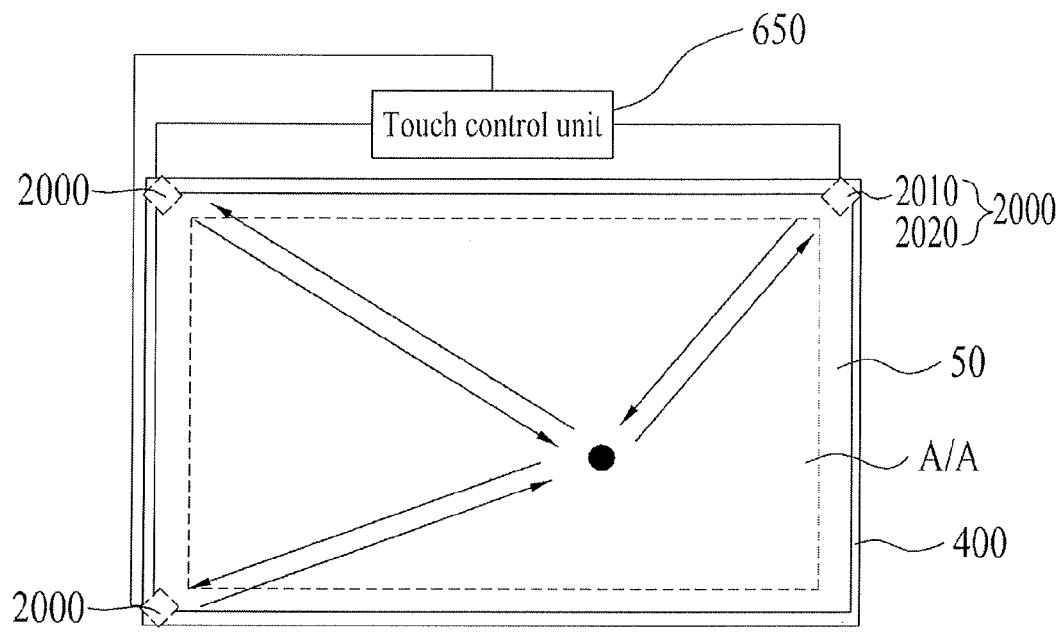

FIG. 19C illustrates that retro-reflecting plates are not provided on a flat display panel 50 as compared to FIG. 19A. In case of the flat display panel 50 of FIG. 16C, touch is sensed based on reflection of light by a touching object.

A detailed description of some components of FIG. 16C which are substantially the same as those of FIG. 16A will be omitted because it is considered to be unnecessary.

Figure 19D:
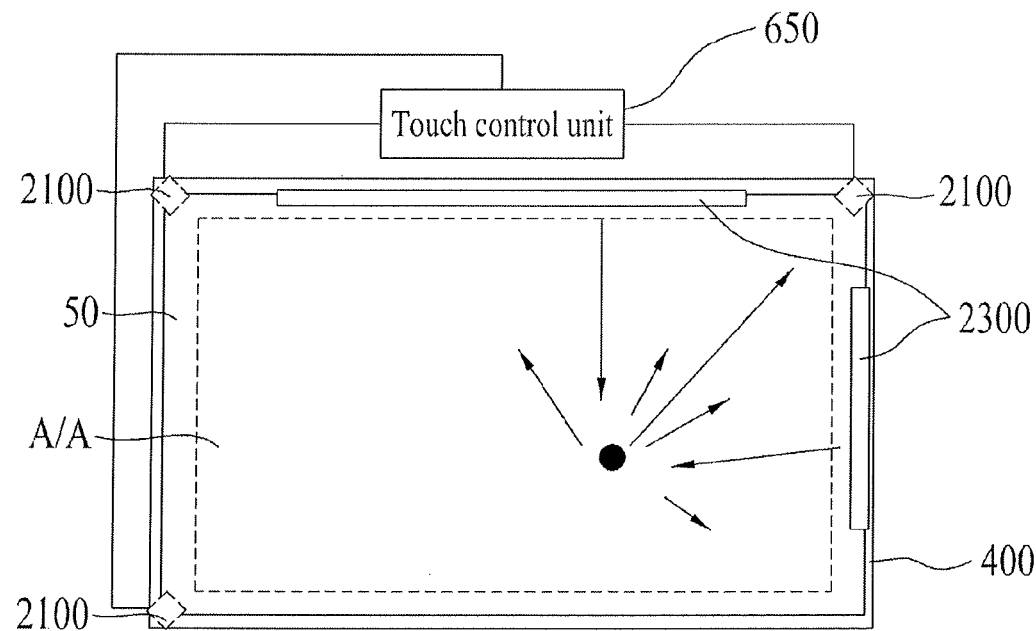

FIG. 19D illustrates that some parts of a light emitting unit 2300 are omitted. Since infrared sensor modules 2100 are located at three corners of a flat display panel 50, even if the light emitting unit 230 is provided at some portions of the flat display panel 50, irradiation of light onto a touching object and detection of a quantity of light reflected by the touching object are possible.

Since the above-mentioned optical sensing unit includes the infrared sensor modules at three corners, a virtual image may be removed through triangulation of angle data of respective touch points using first and second infrared sensor module pairs, each of which includes the two neighboring infrared sensor modules. Further, a touch point on a virtual connection line of the neighboring infrared sensor modules is detected through the remaining infrared sensor module, and thus generation of a dead zone is prevented.

Further, since the above-described optical sensing unit is formed directly on the flat display panel and the upper portion of the optical sensing unit is covered with the top case surrounding the flat display panel, the touch control unit may be integrated with a driving unit formed on the rear surface of the flat display panel.

Meanwhile, in the display device in accordance with the present invention, the infrared sensor modules are preferably arranged at three or more corners of the flat display panel rather than at two corners of the flat display panel.

In case of two or more touch points, a position error, generated when a touch position is detected by the two neighboring infrared sensor modules, is sensed by the remaining infrared sensor module, thereby removing a virtual image and precisely recognizing multiple touch points.

Figure 20:
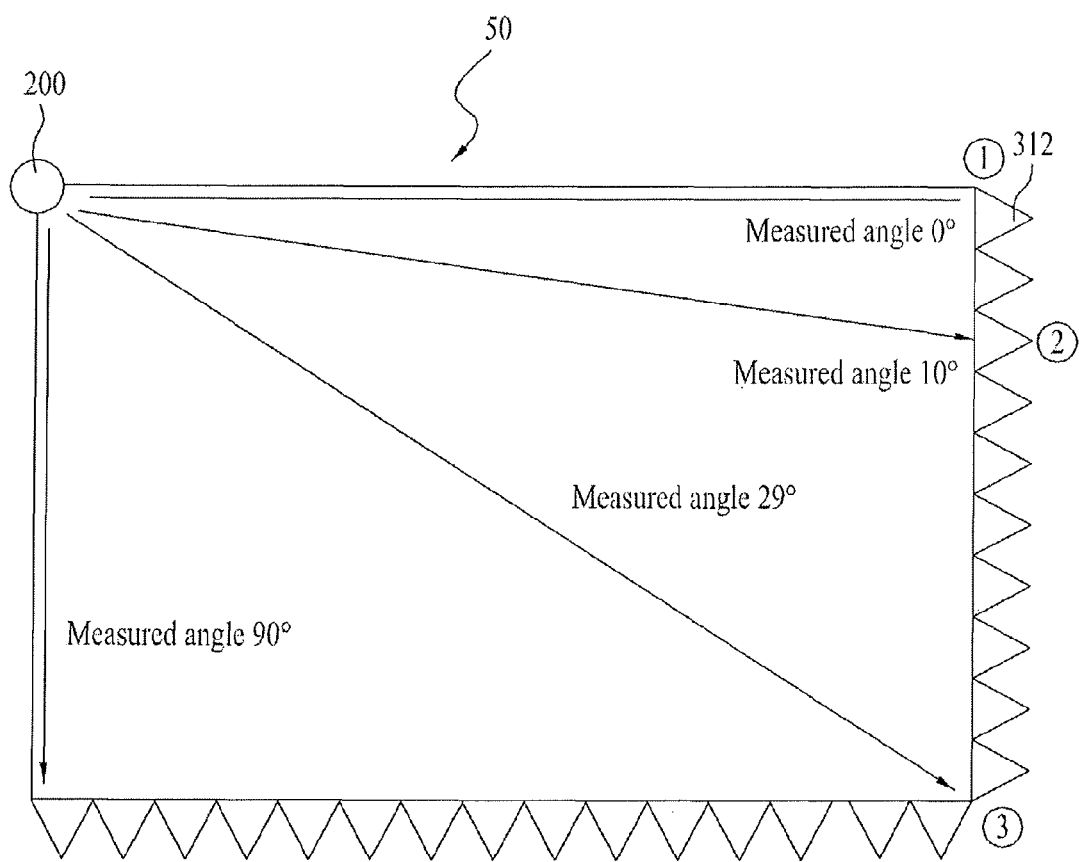
FIG. 20 is a view illustrating angles measured when the infrared sensor module of the display device including the optical sensing unit in accordance with the present invention faces designated regions of the retro-reflecting plate.
Figure 21:
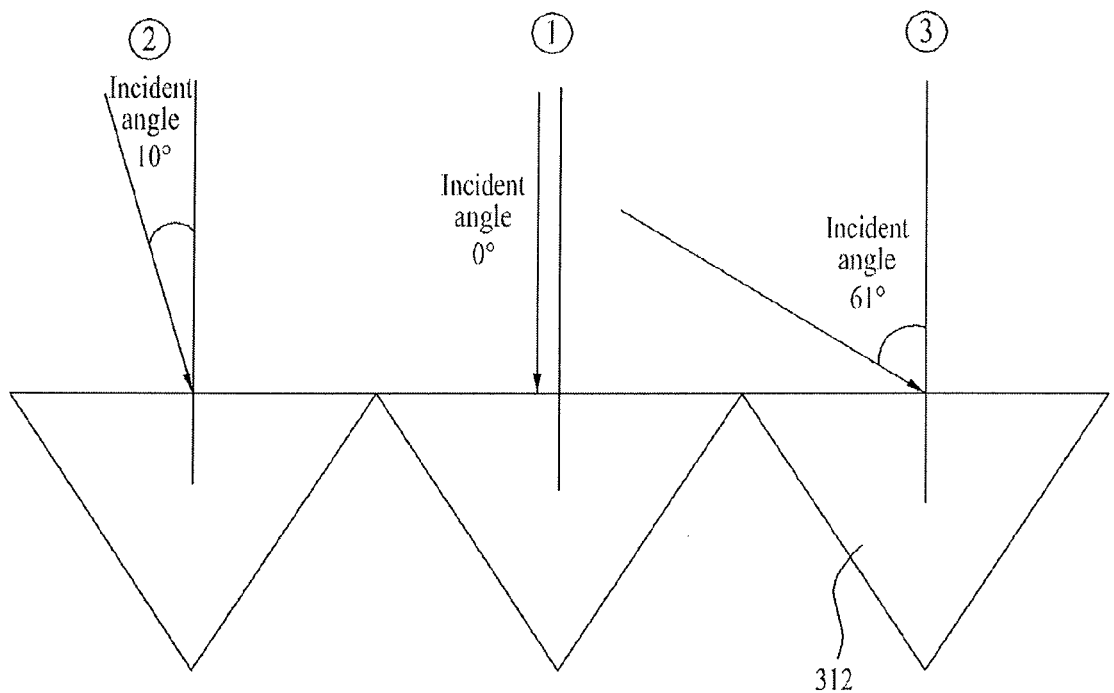
FIG. 21 is a view illustrating angle of incidences of the retro-reflecting plate at respective regions ①, ② and ③ shown in FIG. 20.

FIG. 20 is a view illustrating angles measured when the infrared sensor module of the display device including the optical sensing unit in accordance with the present invention faces designated regions of the retro-reflecting plate, and FIG. 21 is a view illustrating angle of incidences of the retro-reflecting plate at respective regions ①, ② and ③ shown in FIG. 20.

Referring to FIGS. 20 and 21, when the infrared sensor module 200 is located at the upper left corner of the liquid crystal panel 50, an angle between the infrared sensor module 200 and one of the neighboring sides of the liquid crystal panel 50 is set to 0°, and an angle between the infrared sensor module 200 and the other one of the neighboring sides of the liquid crystal panel 50 is set to 90°. Thereby, the angle of light emitted from and incident upon the infrared sensor module 200 is adjusted between the above angles. A prism of the retro-reflecting plate 300 is arranged such that peaks of the prism face the exterior of the liquid crystal panel 50. An incidence angle of light entering the retro-reflecting plate 300 means an angle between a line perpendicular to the upper surface of the retro-reflecting plate 300 and a direct ray of light incident upon the retro-reflecting plate 300. In case of angles of 0° and 10° as in the regions ① and ② of FIG. 20, the same angle of incidence is obtained. However, in the region ③, angles of incidence corresponding to 29° and 61° with respect to the bottom surface of the prism of the retro-reflecting plate 300 are obtained.

Meanwhile, the reflection efficiency of the retro-reflecting plate 300 is inversely proportional to the angle of incidence. If the angle of incidence is about 65° or more, the retro-reflecting efficiency is excessively low such that the retro-reflecting plate 300 does not obtain proper retro-reflecting efficiency and does not achieve proper signal reception. In the liquid crystal display integrated with the optical sensing unit in accordance with the present invention, the retro-reflecting plates 300 are located at four sides of the display panel, and the prism peak of the retro-reflecting plate 300 at each side is arranged to face the top case, such that the angle of incidence of light upon the retro-reflecting plate prism located at each side of the liquid crystal panel is 61° or less with respect to at least one infrared sensor module 200.

Figure 22A:
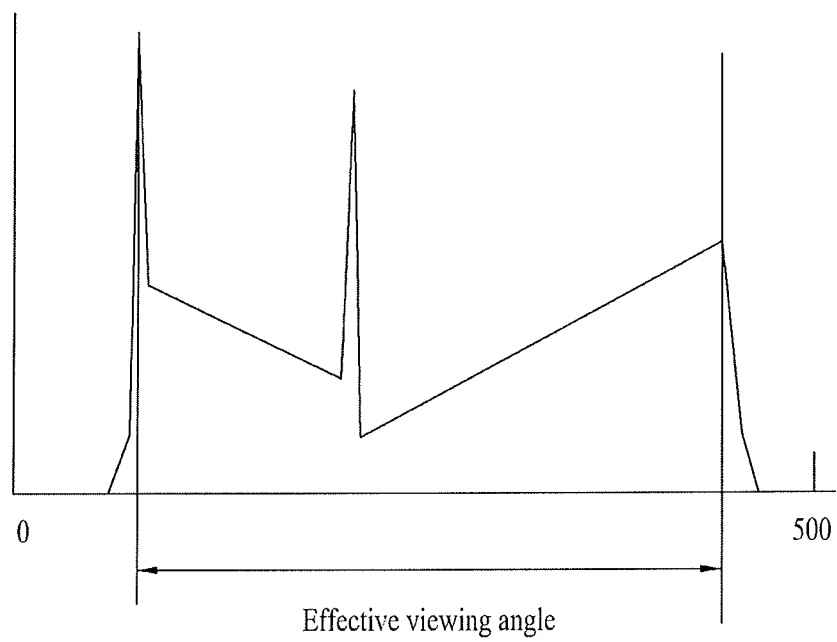
FIGS. 22A to 22C are graphs illustrating quantities of light according to angles of the infrared sensor module facing the retro-reflecting plate.
Figure 22B:
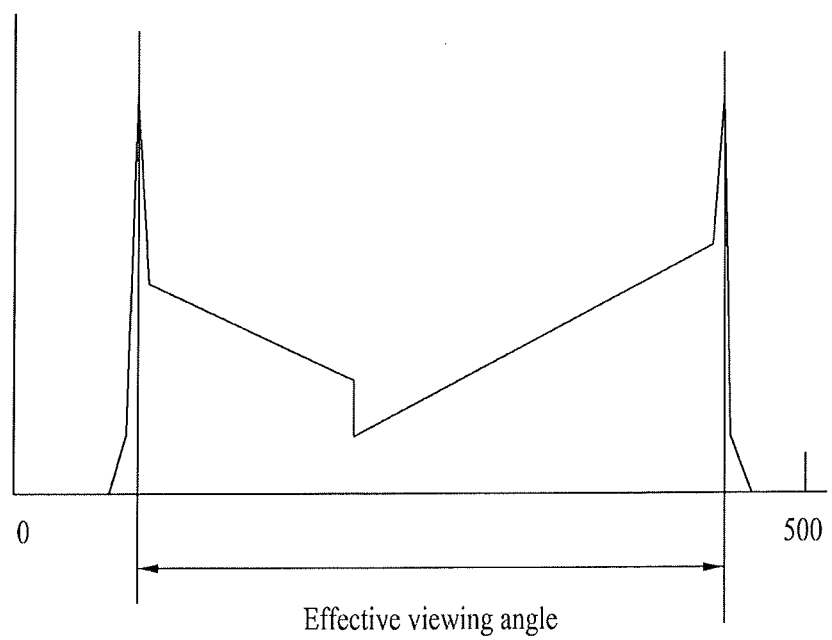
Figure 22C:
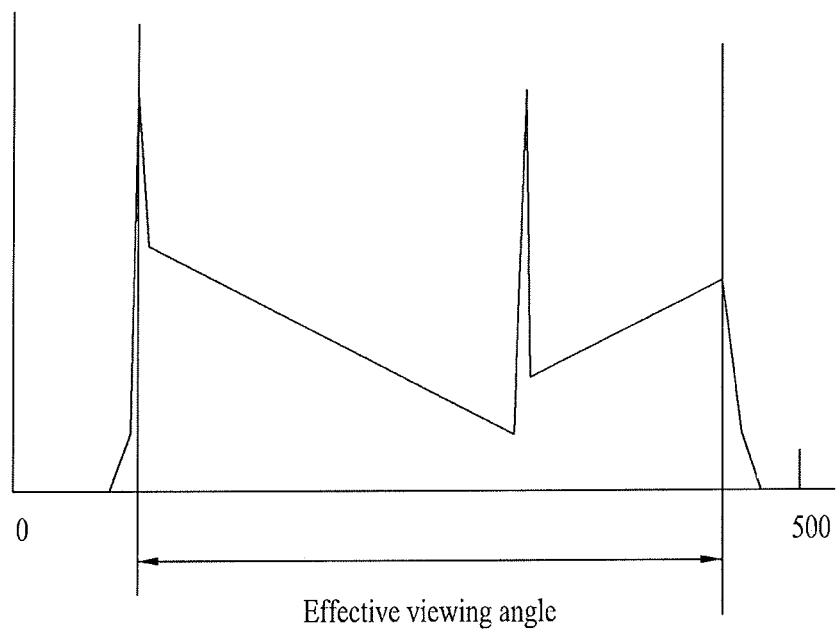

FIGS. 22A to 22C are graphs illustrating quantities of light according to angles of the infrared sensor module facing the retro-reflecting plate.

FIGS. 22A to 22C respectively illustrate distributions of quantities of light sensed by the respective infrared sensor modules which are located corresponding to the right upper corner, the left upper corner, and the left lower corner of the flat display panel.

Each of the infrared sensor modules of FIGS. 19A to 19C includes a sensor having 1 to 500 light receiving elements. The number of the light receiving elements may be increased or decreased.

In this case, the area sensed by each infrared sensor module is defined as the $1^{st}$ light receiving element to the $500^{th}$ light receiving element, an angle of view capable of being sensed by the infrared sensor module is set to about 98°. However, both sides of the infrared sensor module are partially covered with the guide structures, and thus a distribution of quantities of light is formed in an area of about 90° or lower. Therefore, among the 500 light receiving elements of each infrared sensor module, about 460 light receiving elements are present in a region corresponding to the angle of 90° where quantities of light are substantially distributed, and the infrared sensor modules located at the respective corners of the flat display panel have distributions of quantities of light shown in FIGS. 19A to 19C.

Since positions of the respective infrared sensor modules and angles of the respective infrared sensor modules facing the retro-reflecting plates are different, distributions of quantities of light received by the respective infrared sensor modules are different. Further, the reason why a high peak is generated in the distributions of quantities of light is that one infrared sensor module directly receives infrared light emitted from another infrared sensor module at an angle where the former infrared sensor module faces the latter infrared sensor module.

A touch process performed by the Infrared sensor module 200 and the retro-reflecting plate 300 contained in the liquid crystal display including the touch assembly according to the present invention will hereinafter be described in detail.

Figure 23:
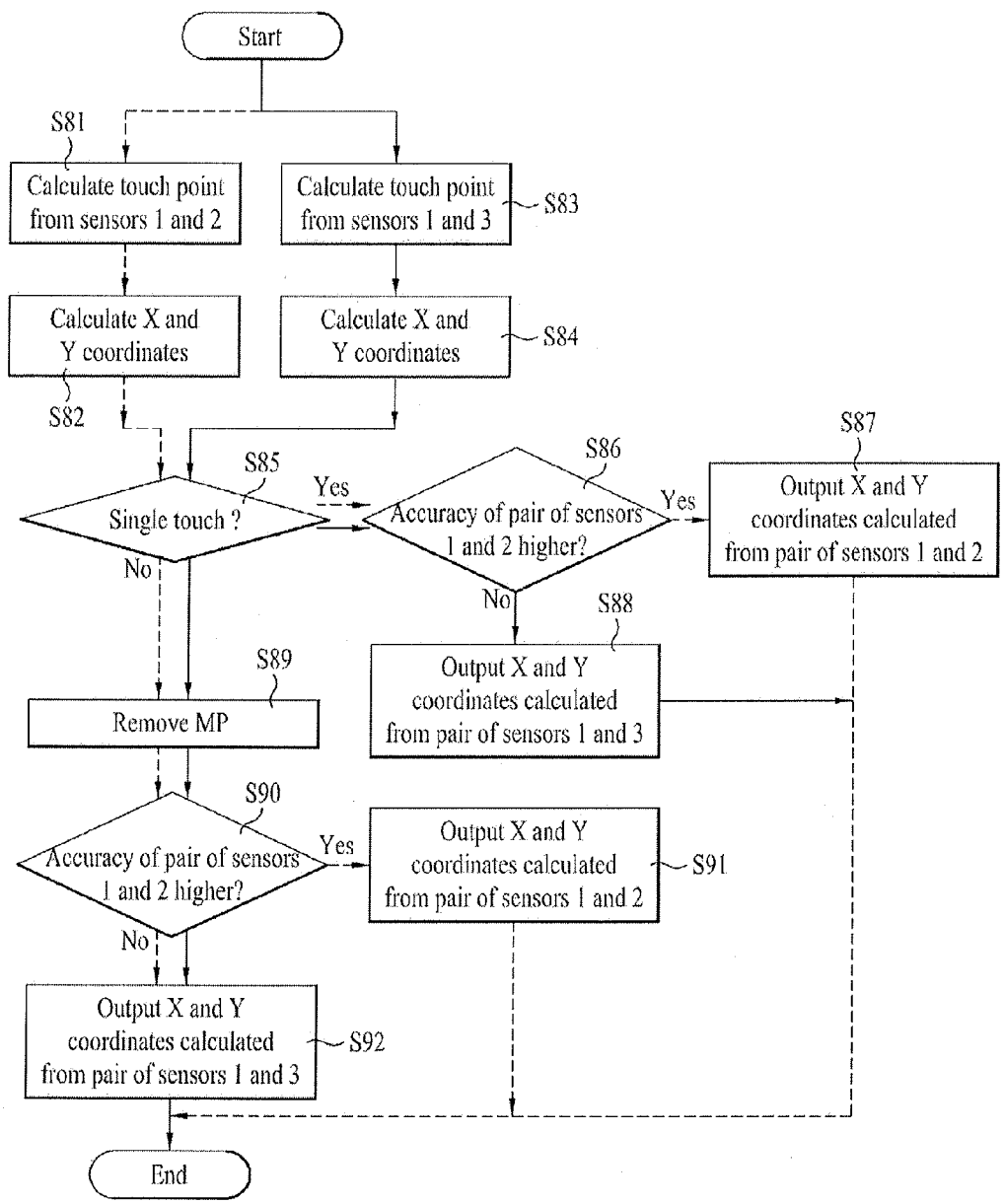
FIG. 23 is a flowchart illustrating a touch sensing process according to an embodiment of the present invention.
Figure 24:
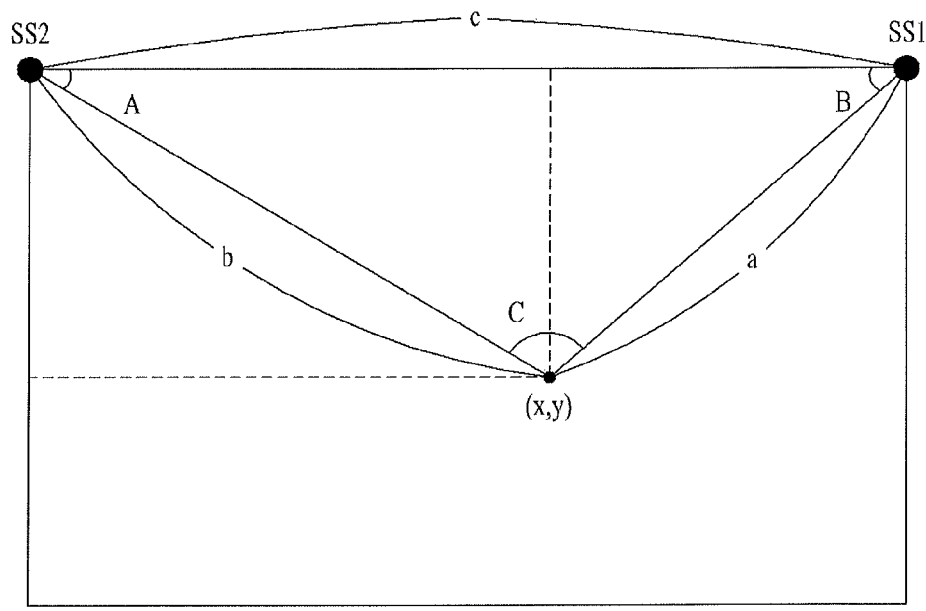
FIG. 24 is a view illustrating an angle of touch position and relations of coordinate.
Figure 25:
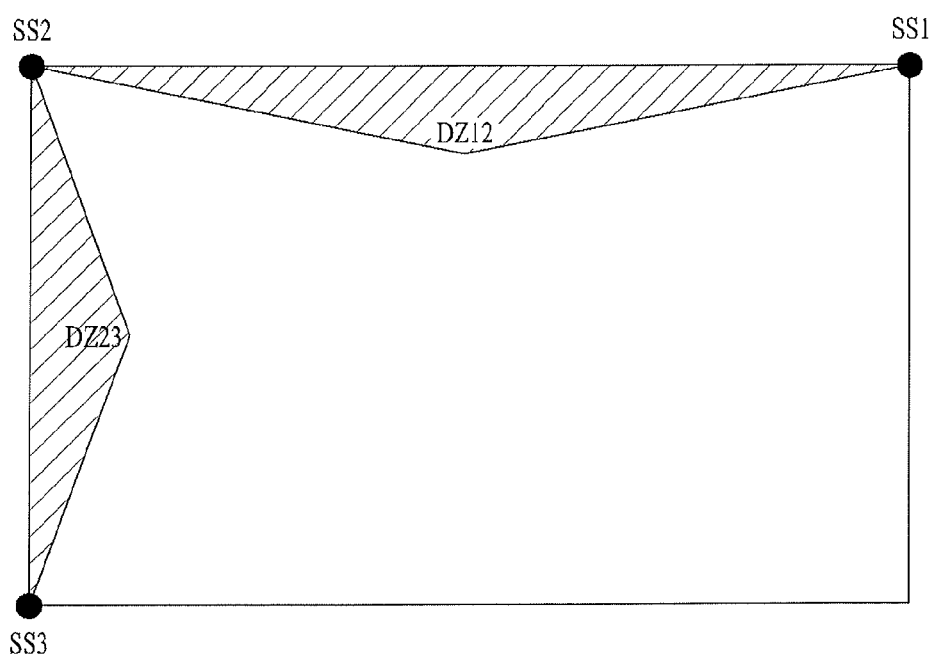
FIG. 25 is a view illustrating a deadzone when a pair of infrared sensing module are provide.
Figure 26:
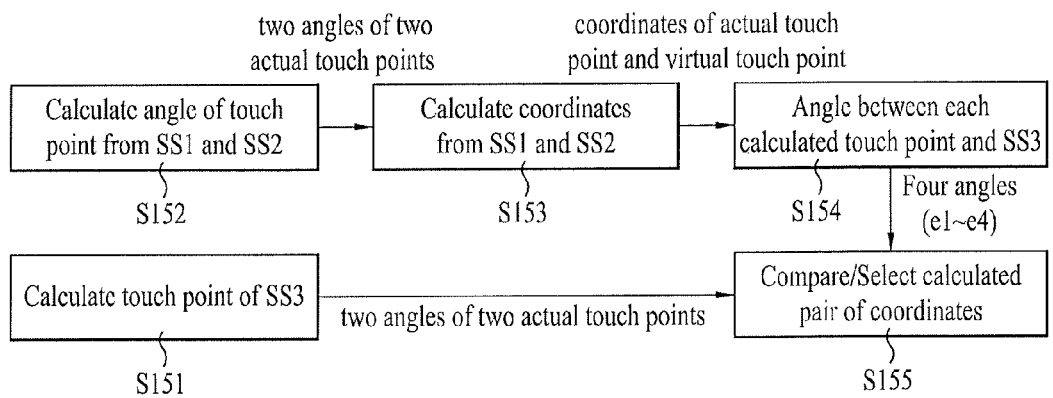
FIG. 26 is a flowchart illustrating the flow of control in step S89 shown in FIG. 16.
Figure 27:
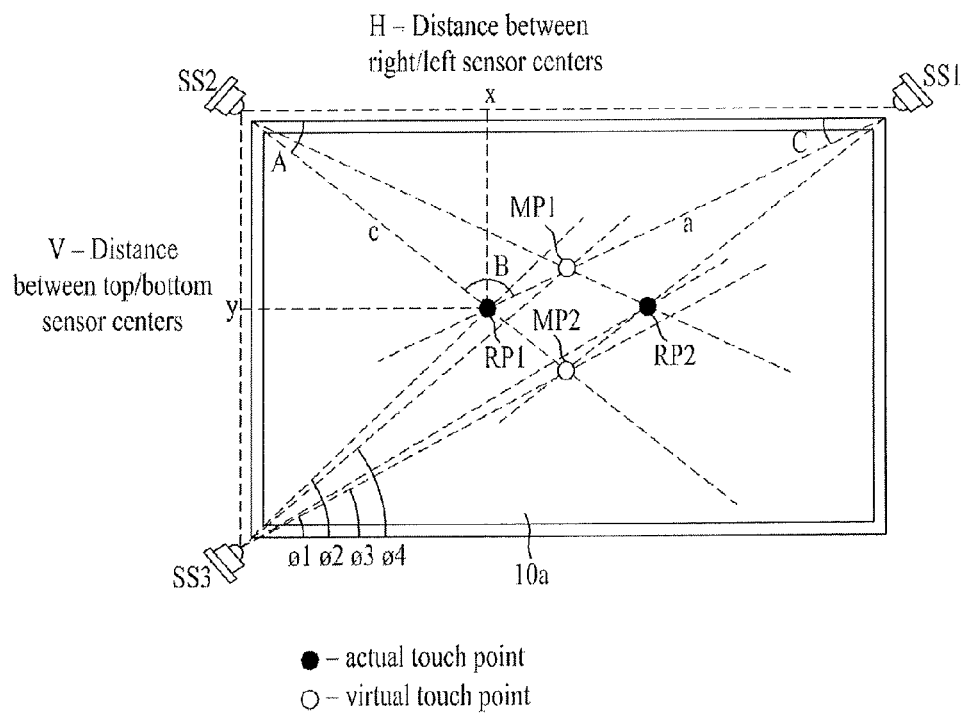
FIG. 27 is a conceptual diagram illustrating an algorithm for removing a virtual image.

FIG. 23 is a flowchart illustrating a touch sensing process according to an embodiment of the present invention. FIG. 24 is a view illustrating an angle of touch position and relations of coordinate. FIG. 25 is a view illustrating a deadzone when a pair of infrared sensing module are provide. FIG. 26 is a flowchart illustrating the flow of control in step S89 shown in FIG. 16 and FIG. 27 is a conceptual diagram illustrating an algorithm for removing a virtual image.

A control unit for controlling the flat display device for use in the flat display panel including an optical sensing unit includes a multi-touch processor for controlling a touch process.

Referring to FIG. 23, the multi-touch processor receives images from pairs of infrared sensor modules, calculates an angle between the infrared sensor modules (hereinafter referred to as '200') and each touch point, calculates X and Y coordinates of each touch point on the basis of the calculated angle, and removes coordinate value of a touch given to a dead zone (DZ) and coordinate values of a virtual image (MP).

Referring to FIG. 23, the multi-touch processor receives images captured by a first pair of infrared sensor modules (SS1 and SS2) (hereinafter referred to as a 'first infrared sensor modules pair'), such that it calculates angles at which the infrared sensor modules SS1 and SS2 view respective touch points in step S81. The multi-touch processor receives images captured by a second pair of infrared sensor modules (SS1 and SS3) (hereinafter referred to as a 'second infrared sensor modules pair'), such that it calculates angles at which the infrared sensor modules SS1 and SS3 view respective touch points in step S83. The angle (θ) between each touch point and each infrared sensor modules can be represented by the following equation 1.

$$\theta = \frac{P_{touch}}{L} \times \theta_{view} \qquad \text{[Equation 1]}$$

In Equation 1, $P_{touch}$ is a position of a touched object on the image, L is a horizontal width of an image, $\theta_{view}$ is an angle of view of the infrared sensor modules.

In steps S82 and S84, the multi-touch processor calculates X and Y coordinates of each touch point using triangulation using a triangular function represented by the following equation 2 in steps S82 and S84 (Please refer FIGS. 25 and 25). The following equation 2 is adapted to use one touch point as two-dimensional XY coordinates.

$$\begin{aligned} a &= c * \frac{\sin A}{\sin C} \\ b &= c * \frac{\sin B}{\sin C} \\ x &= b * \cos A \\ y &= b * \sin A \end{aligned} \qquad \text{[Equation 2]}$$

As can be seen from FIGS. 24 and 25, Equation 2 includes a variety of functions, for example, angles A and B between each touch point calculated in steps S81 and S84 and the infrared sensor modules, and distances (a, b, and c) between the infrared sensor modules and each touch point. An angle C between the touch position and each cameras can be represented by an equation "C=180−Angle A−Angle B".

In steps S82 and S84, each calculated touch point may include coordinate values of a dead zone (DZ) and coordinate values of a virtual image (MP). The multi-touch processor processes the algorithm composed of steps S85 to S92, and thus removes coordinate values of the dead zone (DZ) and the virtual image (MP). Prior to describing the above-mentioned method, the virtual image (MP) and the dead zone (DZ) will hereinafter be described.

Provided that two actual touch points (RP1 and RP2) are present on the touch screen 10a, not only the intersection points of the actual touch points but also virtual touch points (MP1 and MP2) are present in the elongated lines of the touch points (RP1 and RP2) and the infrared sensor modules SS1 and SS2. In steps S81 to S84, X and Y coordinate values of four touch points are calculated without a distinction between each actual touch point RP1 or RP2 and each virtual touch point MP1 or MP2. As illustrated in the present invention, in order to construct two infrared sensor modules pairs, provided three infrared sensor modules SS1, SS2 and SS3 are respectively arranged at three corners of the touch screen 10a and two actual touch points are input to the touch screen 10a, not only actual touch points, but also a pair of virtual touch points (hereinafter referred to as a virtual touch-point pair) viewed by the first infrared sensor modules pair (SS1 and SS2) and another pair of virtual touch points viewed by the second infrared sensor modules pair (SS1 and SS3) are displayed. If one touch point (i.e., a single touch) is input to the touch screen 10a, only one intersection point is present in the elongated lines of the infrared sensor modules and the single touch point, such that no virtual image appears. Therefore, if the number of touch-point coordinates detected in steps S81 to S84 is only one, the multi-touch processor removes only the coordinate values of the dead zone (DZ) without removing the virtual touch point in steps S86 to S88. The dead zone (DZ) is present in a specific part in which an angle between the infrared sensor modules pairs is high and the touch accuracy is considerably low. If a single touch is input, the multi-touch processor compares the single touch point with coordinate values of the dead zones DZ12 and DZ13. If it is determined that the single touch point is present in the dead zones, the multi-touch processor determines which dead zone includes the single touch point in steps S85 and S86.

As a result, if the single touch point belongs to the second dead zone DZ13, the multi-touch processor outputs coordinate values calculated by the first infrared sensor modules pair (SS1 and SS2) in step S87. If the single touch point belongs to the first dead zone DZ12, the multi-touch processor outputs coordinate values calculated by the second infrared sensor modules pair (SS1 and SS3) in step S88. Therefore, the multi-touch processor selects coordinate values acquired from one infrared sensor modules pair having higher touch accuracy from among the first and second infrared sensor modules pairs (SS1 and SS2, SS1 and SS3), such that it can select coordinate values not affected by the dead zones (DZ12 and DZ13) on the touch screen 10a.

In case of multiple touches, the multi-touch processor removes a virtual image from among the multiple touch points caused by the multiple touches, and removes coordinate values of dead zones in steps S85 and S89~S92.

Referring to FIG. 26, the multi-touch processor calculates two angles between the third infrared sensor modules SS3 and each of two actual touch points RP1 and RP2, and stores the calculated angle values in a memory in step S151. The multi-touch processor calculates angles between each of the first and second infrared sensor modules (SS1 and SS2) and each of the actual touch points (RP1 and RP2), and calculates coordinate values of the actual touch points (RP1 and RP2) and the virtual touch points (MP1 and MP2) on the basis of the calculated angles in steps S152 and S153.

The multi-touch processor calculates an angle between each coordinate value calculated in step S152 and the third infrared sensor modules SS3, such that it calculates four angle values in step S154. The multi-touch processor compares two angles (calculated in step S151) between the third infrared sensor modules SS3 and each actual touch point RP1 or RP2 with four angles calculated in step S154, and selects coordinate values each having the least difference among the above angles according to the comparison result in step S155. Meanwhile, calculation of angles and coordinates has already been processed in steps S81 to S84. Therefore, the multi-touch processor stores angles and coordinates calculated in steps S81 to S84 in a memory, and need not perform the calculation processes shown in steps S151 to S154.

The touch points calculated in step S154 include angle values of actual touch points (RP1 and RP2) and angle values of virtual touch points (MP1 and MP2). Among these angle values, there is a little difference between each angle value of the actual touch points (RP1 and RP2) and each angle value of two pre-calculated actual touch points of step S155. Therefore, the multi-touch processor can remove virtual touch points using the virtual image removing algorithm including steps S151 to 155.

If multiple touches are input, the multi-touch processor removes a virtual image using the virtual image removing algorithm of step S89, and compares coordinate values of the actual touch points (RP1 and RP2) with coordinate values of the dead zones (DZ12 and DZ13). If it is determined that the actual touch points (RP1 and RP2) are present in the dead zones DZ12 and DZ13, the multi-touch processor determines which dead zone includes the touch points in step S90. As a result, if the touch points RP1 and RP2 belong to the second dead zone DZ13, the multi-touch processor outputs coordinate values calculated from the first infrared sensor modules pair (SS1 and SS2) in step S91. If the touch points (RP1 and RP2) belong to the first dead zone DZ12, the multi-touch processor outputs coordinate values calculated from the second infrared sensor modules pair (SS1 and SS3) in step S92.

Therefore, the multi-touch processor removes a virtual image when receiving multiple touches, and selects coordinate values having the high touch accuracy from among coordinate values of the remaining actual touch points, such that it can select coordinate values not affected by the dead zones DZ12 and DZ13 on the touch screen 10a.

Although the above-mentioned embodiment of the present invention has disclosed that only three infrared sensor modules are used to construct two pairs of image sensors and remove a virtual image and a coordinate value of a dead zone, it should be noted that three or more infrared sensor modules can also be applied to the present invention without departing from the scope or spirit of the present invention. For example, provided that four infrared sensor modules are used and are respectively arranged at four corners of the touch screen 10a, the number of infrared sensor modules for detecting virtual images is also increased, angle values acquired from the increased infrared sensor modules are compared with one another using the aforementioned virtual image removing algorithm, such that the virtual image can be more accurately removed and the dead-zone influence can be greatly reduced.

A touch detecting scheme for use in the liquid crystal display device integrated with the optical sensing unit in accordance with the present invention will hereinafter be described in detail.

If the light emitting unit (i.e., IR LED) of the infrared sensor module 200 emits infrared light, the retro-reflecting plate 300 reflects the emitted infrared light and again transmits the reflected infrared light to the infrared sensor module 200, such that the reflected infrared light can be sensed by the infrared sensor module 200. In this case, if a touch action occurs at a specific position of the display panel, emitted light or received light is prevented from being transmitted at the corresponding position, and thus the touch position corresponding to the position where transmission of light is blocked may be detected.

As apparent from the above description, an optical sensing unit, a display module and a display device using the same in accordance with the present invention have the following effects.

First, an infrared sensor module is located on the display panel and is covered with a top case or a front cover, thereby allowing the optical sensing unit to be arranged in the display module. Therefore, an optical sensing unit formation process is carried out together with a display module fabrication process, thereby simplifying assembly and reducing assembly time and assembly costs.

Second, a tempered glass panel is omitted and the optical sensing unit including the infrared sensor modules is located within casing elements of the display module without using of a separate casing element. Accordingly, slimness of the display device as well as implementation of a light-weight product and reduction of production costs is realized.

Third, a virtual image is removed through triangulation using three or more infrared sensor modules, and thus multiple touch points are sensed.

Fourth, three or more infrared sensor modules are used such that presence or absence of a touch action on a line connecting the two infrared sensor modules is detected by the remaining infrared sensor module, thereby preventing generation of a dead zone.

Fifth, the infrared sensor modules are formed on the display panel such that the optical sensing unit is covered with a case having a size enough to surround the display panel without increase of the outer size of the display panel. Therefore, although an optical sensing unit having an optical type touch coordinate function is provided, a narrow bezel is achieved.

Sixth, an IR filter is adhered to a retro-reflecting plate and thus a noise signal is reduced, and the IR filter is black in color and thus glare is prevented.

Seventh, the height of the retro-reflecting plate is elongated to the upper surface of the top case, thus improving its own retro-reflecting efficiency by about 30% or more as compared to the conventional structure in which the retro-reflecting plate is covered with the top case. Therefore, touch sensitivity of the product is further increased.

Eighth, a control unit to drive a touch screen is integrated with a control unit of the display module.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A display Module comprising:
a flat display panel having a surface of as a touch surface;
a support main located at an edge of the flat display panel, wherein the flat display panel is on the support main;
at least two infrared sensor modules provided on at least two corners of the flat display panel, respectively;
a retro-reflecting plate arranged on the edge of the flat display panel where the infrared sensor modules are not positioned; and
a guide structure within a top case, wherein the retro-reflecting plate is attached on a side of the guide structure,
wherein the guide structure is coupled to the top case through a guide groove of the top case at an inner part of the top case, and
wherein the guide structure includes:
a body located at a lower side of the top case;
a coupling portion which is protruded from the body, and is coupled to the guide groove of the top case, wherein the top case is made of a metal;
a support which supports the retro-reflecting plate at a lower part and presses the flat display crystal panel; and
an upper protrusion portion which is protruded from the body such that it is brought into contact with a lateral side of an upper surface of the top case covering the flat display panel.

2. The display module according to claim 1, wherein the infrared sensor module contacts the surface of a non-display region of the flat display panel.

3. The display module according to claim 2, wherein the corner of the flat display panel is covered with a casing.

4. The display module according to claim 3, wherein the top case surrounding a non-display region of the flat display panel, and an upper and a side of the support main.

5. The display module according to claim 3, wherein the top case further includes a system cover surrounding a non-display region of the flat display panel, the support main and a system.

6. The display module according to claim 3, wherein the infrared sensor module is on the flat display panel interposing a medium therebetween.

7. The display module according to claim 6, wherein the medium is an adhesive member between the flat display panel and the infrared sensor modules.

8. The display module according to claim 6, wherein the medium is a bracket to fix the infrared sensor module to the corners of the flat display panel.

9. The display module according to claim 8, wherein the medium and the support main are coupled to the casing.

10. The display module according to claim 1, wherein the infrared sensor module is positioned within the top case.

11. The display module according to claim 10, wherein the infrared sensor module is attached or fixed within the top case.

12. The display module according to claim 1, wherein the infrared sensor module contacts the support main.

13. The display module according to claim 1, wherein the infrared sensor module contacts the support main and a non-display region of the flat display panel.

14. A display device comprising:
a flat display panel having a surface of as a touch surface;
a support main located at an edge of the flat display panel, wherein the flat display panel is on the support main;
at least two infrared sensor modules provided on at least two corners of the flat display panel, respectively;
a casing surrounding edges of the flat display panel including the infrared sensor modules, and the support main;
a retro-reflecting plate arranged on the edge of the flat display panel where the infrared sensor modules are not positioned; and
a guide structure within a top case, wherein the retro-reflecting plate is attached on a side of the guide structure,
wherein the guide structure is coupled to the top case through a guide groove of the top case at an inner part of the top case, and
wherein the guide structure includes:
a body located at a lower side of the top case;

a coupling portion which is protruded from the body, and is coupled to the guide groove of the top case, wherein the top case is made of a metal;

a support which supports the retro-reflecting plate at a lower part and presses the flat display crystal panel; and an upper protrusion portion which is protruded from the body such that it is brought into contact with a lateral side of an upper surface of the top case covering the flat display panel.

15. The display module according to claim 14, wherein the casing further includes a system cover made of a plastic material.

16. The display device according to claim 14, wherein the casing further includes a system cover covering the case top.

17. The display device according to claim 16, wherein the system cover has an upper surface covering the retro-reflecting plate.

18. The display device according to claim 17, wherein a front of the infrared sensor module faces a diagonal corner of the flat panel display.

19. The display device according to claim 14, wherein the guide structure is positioned on four sides of the flat display panel.

20. The display device according to claim 19, the guide structure is connected at adjacent sides where the infrared sensor modules are not formed.

21. The display device according to claim 14, wherein a height of the guide structure including the protrusion portion, the body, and the support is set to be about 1 mm~3.5 mm.

22. The display device according to claim 14, wherein a horizontal width of the guide structure is equal to about 1 mm~10 mm.

23. The display device according to claim 14, wherein the support of the guide structure is equal to or thicker than a thickness of the retro-reflecting plate, and is protruded from the body to the flat display panel.

24. The display device according to claim 14, wherein the infrared sensor module includes:

an infrared LED for emitting an infrared light; and a photo-sensor for sensing the light received.

25. The display device according to claim 24, wherein the photo-sensor is implemented as a line-sensor array including a plurality of sensors.

26. The display device according to claim 25, wherein the photo-sensor has a resolution of at least 500 pixels in a horizontal direction.

27. The display device according to claim 24, wherein the infrared sensor module receives and detects a light retro-reflected from at least two sides and a light emitted from another infrared sensor module located at a corner of a front side of a diagonal direction.

28. The display device according to claim 24, wherein, if a touch action occurs at a specific position, the infrared sensor module detects that a reflection light reflected from the retro-reflecting plate and emitted light form another infrared sensor module is blocked at the touch position.

29. The display device according to claim 14, wherein the retro-reflecting plate includes a prism group composed of a plurality of prisms for performing a retro-reflecting operation, wherein peaks of the prisms are located in a direction from the flat display panel to the top case.

30. The display device according to claim 29, wherein the retro-reflecting plate further includes an optical filter through which only infrared light passes.

31. The display device according to claim 30, wherein the optical filter is formed of acrylic resin.

32. The display device according to claim 30, wherein the optical filter is formed of poly methyl methacrylate (PMMA) or polycarbonate.

33. The display device according to claim 30, wherein the optical filter includes a glass material.

34. The display device according to claim 14, further comprising:

a touch-sensing controller for controlling the infrared sensor module, wherein the touch-sensing controller is contained in a control unit for controlling the flat panel display.

* * * * *